United States Patent
Kim et al.

(10) Patent No.: US 10,517,142 B2
(45) Date of Patent: Dec. 24, 2019

(54) METHOD FOR TRANSMITTING AND RECEIVING FRAME IN WIRELESS LAN SYSTEM, AND APPARATUS THEREFOR

(71) Applicant: LG ELECTRONICS INC., Seoul (KR)

(72) Inventors: Jeongki Kim, Seoul (KR); Kiseon Ryu, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/060,398

(22) PCT Filed: Dec. 12, 2016

(86) PCT No.: PCT/KR2016/014513
§ 371 (c)(1),
(2) Date: Jun. 7, 2018

(87) PCT Pub. No.: WO2017/099546
PCT Pub. Date: Jun. 15, 2017

(65) Prior Publication Data
US 2018/0359807 A1      Dec. 13, 2018

Related U.S. Application Data

(60) Provisional application No. 62/266,014, filed on Dec. 11, 2015, provisional application No. 62/314,412, (Continued)

(51) Int. Cl.
*H04L 5/00* (2006.01)
*H04W 80/02* (2009.01)
(Continued)

(52) U.S. Cl.
CPC .......... *H04W 80/02* (2013.01); *H04L 5/0053* (2013.01); *H04L 5/0094* (2013.01);
(Continued)

(58) Field of Classification Search
CPC . H04W 80/02; H04W 12/06; H04W 72/0446; H04W 72/0413; H04W 72/04;
(Continued)

(56) References Cited

U.S. PATENT DOCUMENTS

| 7,164,671 B2 * | 1/2007 | del Prado | H04W 16/14 370/338 |
| 2008/0227488 A1 * | 9/2008 | Zhu | H04W 88/06 455/553.1 |

(Continued)

FOREIGN PATENT DOCUMENTS

KR      1020120016985      2/2012

OTHER PUBLICATIONS

PCT International Application No. PCT/KR2016/014513, Written Opinion of the International Searching Authority dated Apr. 13, 2017, 15 pages.
(Continued)

*Primary Examiner* — Un C Cho
*Assistant Examiner* — Rasha K Fayed
(74) *Attorney, Agent, or Firm* — Lee Hong Degerman Kang Waimey

(57) ABSTRACT

A method for transmitting a frame by a STA in a wireless LAN system according to an embodiment of the present invention may comprise: receiving a first frame from an AP; determining, on the basis of the first frame, a TXOP duration value to be included in a SIG field of a second frame that the STA is to transmit; and transmitting the second frame, in determining the TXOP duration value, the STA calculates a residual TXOP duration that may retain after the second
(Continued)

(a)

(b)

frame is transmitted, on the basis of a TXOP duration indicated through the first frame, and when the residual TXOP duration is not a multiple of a granularity of a time unit used by the SIG field, the STA approximates the residual TXOP duration to be a first TXOP duration value which is a multiple of the granularity.

14 Claims, 19 Drawing Sheets

Related U.S. Application Data filed on Mar. 29, 2016, provisional application No. 62/350,202, filed on Jun. 15, 2016, provisional application No. 62/362,058, filed on Jul. 14, 2016.

(51) Int. Cl.
*H04W 84/12* (2009.01)
*H04W 72/04* (2009.01)
*H04W 74/00* (2009.01)
*H04W 74/04* (2009.01)
*H04W 12/06* (2009.01)
*H04W 74/08* (2009.01)

(52) U.S. Cl.
CPC ... *H04W 72/0413* (2013.01); *H04W 72/0446* (2013.01); *H04W 74/006* (2013.01); *H04W 74/04* (2013.01); *H04W 84/12* (2013.01); *H04W 12/06* (2013.01); *H04W 74/0808* (2013.01)

(58) Field of Classification Search
CPC ............. H04W 72/0453; H04W 72/02; H04W 74/0808; H04W 74/04; H04W 74/006; H04W 74/08; H04W 74/085; H04W 74/06; H04W 74/0891; H04W 74/0816; H04W 74/0866; H04W 74/002; H04W 84/12; H04W 52/0229; H04W 52/0235; H04W 52/0225; H04W 28/12; H04W 28/04; H04W 28/02; H04W 28/0205; H04W 92/10; H04W 92/0205; H04W 76/20; H04W 76/27; H04L 5/00; H04L 5/0053; H04L 5/0023; H04L 5/0055; H04L 5/001; H04L 1/1685; H04L 1/1854; H04L 1/1621; H04L 1/1671; H04L 1/00; H04B 7/0452

See application file for complete search history.

(56) References Cited

U.S. PATENT DOCUMENTS

| | | | | |
|---|---|---|---|---|
| 2014/0079016 A1* | 3/2014 | Dai | ........................ | H04L 5/0041 370/330 |
| 2014/0192742 A1* | 7/2014 | Gong | .................... | H04L 1/1685 370/329 |
| 2014/0341128 A1* | 11/2014 | Turtinen | ............... | H04W 28/18 370/329 |
| 2015/0016437 A1* | 1/2015 | Wentink | .............. | H04W 74/085 370/338 |
| 2016/0050093 A1* | 2/2016 | Choi | ................... | H04L 27/2602 375/308 |
| 2017/0289987 A1* | 10/2017 | Seok | ...................... | H04W 74/00 |
| 2018/0084580 A1* | 3/2018 | Anepu | .................. | H04W 28/06 |

OTHER PUBLICATIONS

Kim, J. et al., "MU TXOP Truncation", doc.: IEEE 802.11-15/1067r0, Sep. 2015, 16 pages.

* cited by examiner

FIG. 20
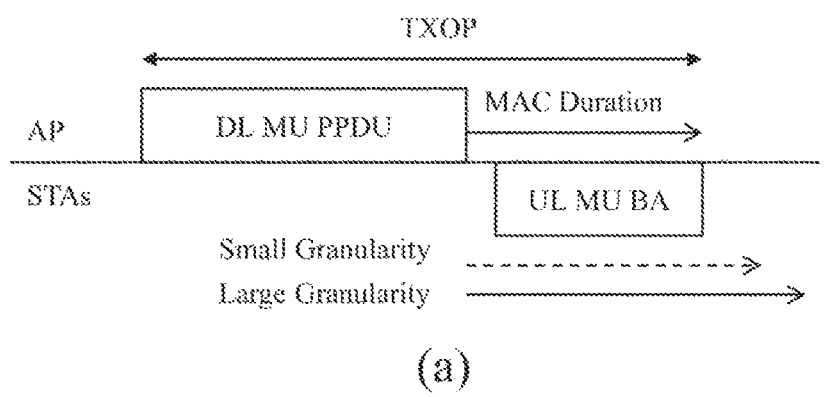
(a)
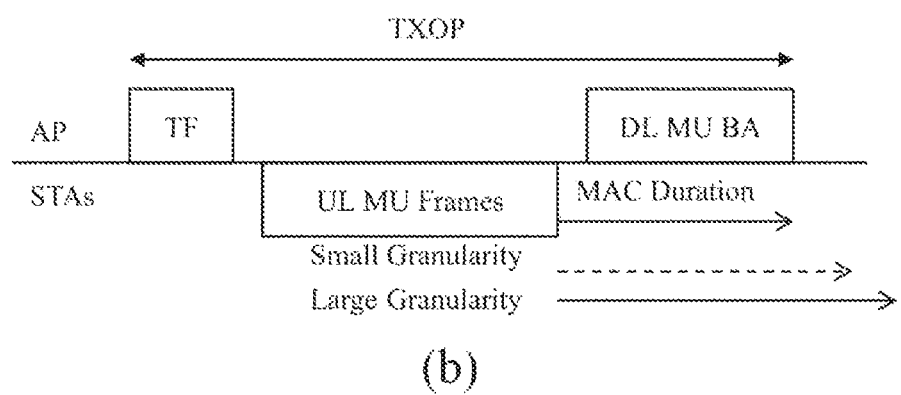
(b)

FIG. 21

| Length | Cascade Indication | TXOP Duration field of HE PPDU | CS Required | SR parameter | CP and LTF Type | Trigger Type | Trigger-dependent Common Info |
|---|---|---|---|---|---|---|---|
| 12 | 1 | TBD | 1 | TBD | TBD | TBD | variable |

Bits:

METHOD FOR TRANSMITTING AND RECEIVING FRAME IN WIRELESS LAN SYSTEM, AND APPARATUS THEREFOR

CROSS-REFERENCE TO RELATED APPLICATIONS

This application is the National Stage filing under 35 U.S.C. 371 of International Application No. PCT/KR2016/014513, filed on Dec. 12, 2016, which claims the benefit of U.S. Provisional Application Nos. 62/266,014, filed on Dec. 11, 2015, 62/314,412, filed on Mar. 29, 2016, 62/350,202, filed on Jun. 15, 2016, and 62/362,058, filed on Jul. 14, 2016, the contents of which are all hereby incorporated by reference herein in their entirety.

TECHNICAL FIELD

The present invention relates to a method of transmitting and receiving a frame in a wireless LAN system, and more particularly, to a method of transmitting or receiving a frame including a TXOP duration field and an apparatus therefor.

BACKGROUND ART

Standards for Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE OF THE INVENTION

Technical Task

A technical task of the present invention is to provide a method of transmitting and receiving a frame by more precisely and efficiently configuring a TXOP (transmission opportunity) duration included in a signaling field and an apparatus therefor.

The present invention is not limited to the above technical problems and other technical objects may be inferred from embodiments of the present invention.

Technical Solution

To achieve these and other advantages and in accordance with the purpose of the present invention, as embodied and broadly described, according to one embodiment, a method of transmitting a frame, which is transmitted by a station (STA) in a wireless LAN system, includes receiving a first frame from an access point (AP), determining, based on the first frame, a transmission opportunity (TXOP) duration value included in a signaling (SIG) field of a second frame to be transmitted by the STA, and transmitting the second frame. In determining the TXOP duration value, the STA calculates, based on a TXOP duration indicated by the first frame, a residual TXOP duration to be remained after the second frame is transmitted and when the residual TXOP duration is not a multiple of a granularity of a time unit used in the SIG field, the STA can approximate the residual TXOP duration to a first TXOP duration value which is the multiple of the granularity.

To further achieve these and other advantages and in accordance with the purpose of the present invention, according to a different embodiment, a station (STA) in a wireless LAN system includes a receiver to receive a first frame from an access point (AP), a processor to determine, based on the first frame, a transmission opportunity (TXOP) duration value included in a signaling (SIG) field of a second frame transmitted by the STA, and a transmitter to transmit the second frame. In determining the TXOP duration value, the processor can calculate, based on a TXOP duration indicated by the first frame, a residual TXOP duration to be remained after the second frame is transmitted and when the residual TXOP duration is not a multiple of a granularity of a time unit used in the SIG field, the processor can approximate the residual TXOP duration to a first TXOP duration value which is the multiple of the granularity.

The residual TXOP duration can be calculated by subtracting a length of the second frame and an inter-frame space from the TXOP duration indicated by the first frame.

In determining the TXOP duration value, the STA selects the TXOP duration value from among the first TXOP duration value and a second TXOP duration value indicating that the TXOP duration value is not valid. The first frame can include an indicator indicating whether the STA should select the first TXOP duration value or the second TXOP duration value.

The first frame may correspond to a trigger frame allocating a resource for multi-user uplink transmission.

The second frame may correspond to a multi-user uplink frame transmitted via the resource allocated by the trigger frame.

The indicator can be received via a common information field or a high throughput (HT) control field of the trigger frame.

The STA configures MAC duration included in a MAC header of the second frame by the residual TXOP duration. In this case, the first TXOP duration value may be a value closest to the MAC duration among values which are multiples of the granularity and are equal to or less than the MAC duration.

The SIG field includes 7-bit of a TXOP duration field indicating the TXOP duration value and the TXOP duration field supports multiple granularities of time units.

A most significant bit (MSB) of the 7-bit of the TXOP duration field indicates a granularity used for the TXOP duration value among the multiple granularities of the time units.

Advantageous Effects

According to one embodiment of the present invention, if a residual TXOP duration for a frame transmission is indicated by a signaling field, it is able to more precisely and efficiently configure TXOP duration. Moreover, Third STAs, which do not decode an MAC header, can precisely protect a TXOP of a TXOP holder/responder.

Other technical effects in addition to the above-described effects may be inferred from embodiments of the present invention.

DESCRIPTION OF DRAWINGS

FIG. 20 illustrates a TXOP duration configuration according to one embodiment of the present invention;

FIG. 21 illustrates a common info field of a trigger frame according to one embodiment of the present invention;

MODE FOR INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described before, the following description is given of a method and apparatus for increasing a spatial reuse rate in a Wireless Local Area Network (WLAN) system. To do so, a WLAN system to which the present invention is applied will first be described in detail.

Figure 1:
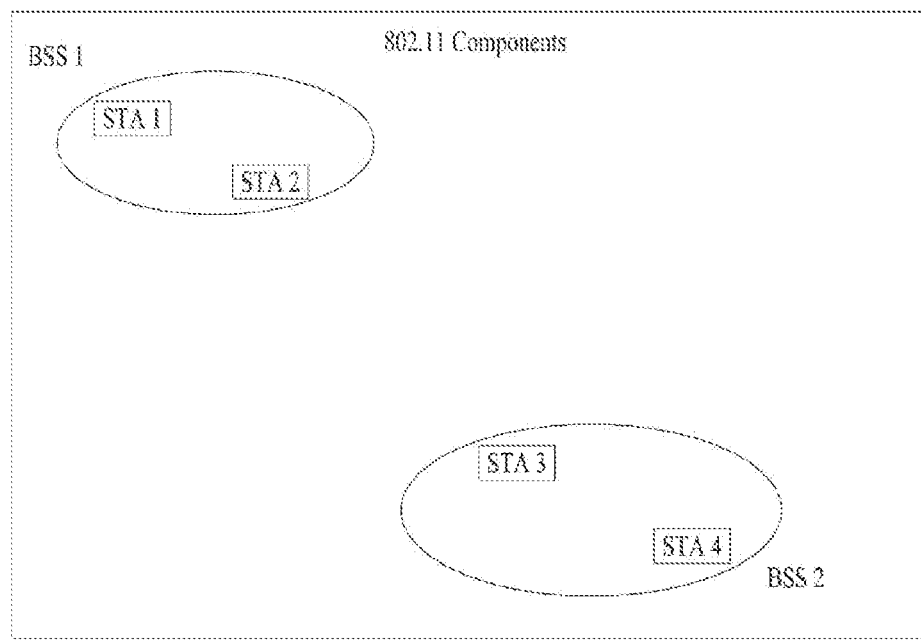
FIG. 1 illustrates an example of a configuration of a wireless LAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
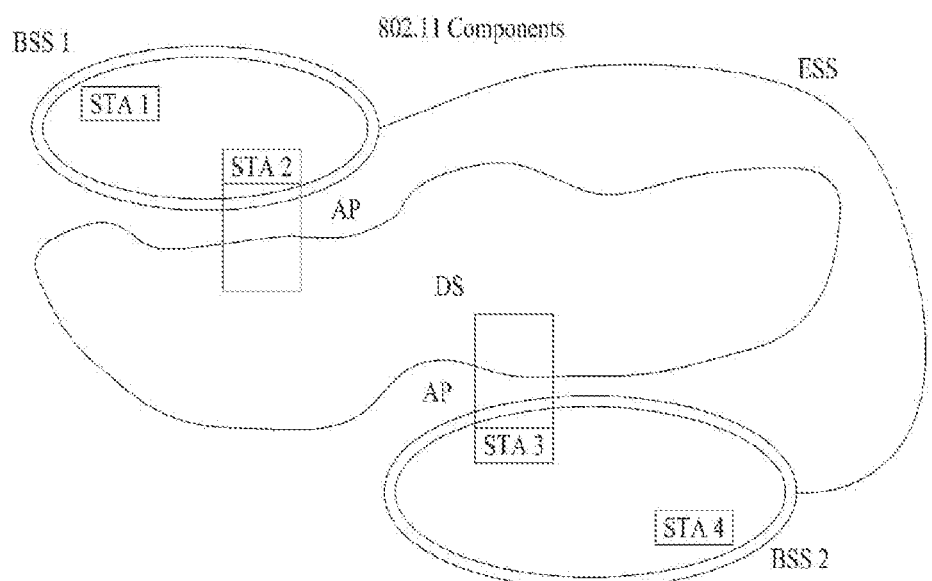
FIG. 2 illustrates another example of a configuration of a wireless LAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Layer Architecture

An operation of an STA in a WLAN system may be described from the perspective of a layer architecture. A processor may implement the layer architecture in terms of device configuration. The STA may have a plurality of layers. For example, the 802.11 standards mainly deal with a MAC sublayer and a PHY layer on a Data Link Layer (DLL). The PHY layer may include a Physical Layer Convergence Protocol (PLCP) entity, a Physical Medium Dependent (PMD) entity, and the like. Each of the MAC sublayer and the PHY layer conceptually includes management entities called MAC sublayer Management Entity (MLME) and Physical Layer Management Entity (PLME). These entities provide layer management service interfaces through which a layer management function is executed.

To provide a correct MAC operation, a Station Management Entity (SME) resides in each STA. The SME is a layer independent entity which may be perceived as being present in a separate management plane or as being off to the side. While specific functions of the SME are not described in detail herein, the SME may be responsible for collecting layer-dependent states from various Layer Management Entities (LMEs) and setting layer-specific parameters to similar values. The SME may execute these functions and implement a standard management protocol on behalf of general system management entities.

The above-described entities interact with one another in various manners. For example, the entities may interact with one another by exchanging GET/SET primitives between them. A primitive refers to a set of elements or parameters related to a specific purpose. An XX-GET.request primitive is used to request a predetermined MIB attribute value (management information-based attribute information). An XX-GET.confirm primitive is used to return an appropriate MIB attribute information value when the Status field indicates "Success" and to return an error indication in the Status field when the Status field does not indicate "Success". An XX-SET.request primitive is used to request setting of an indicated MIB attribute to a predetermined value. When the MIB attribute indicates a specific operation, the MIB attribute requests the specific operation to be performed. An XX-SET.confirm primitive is used to confirm that the indicated MIB attribute has been set to a requested value when the Status field indicates "Success" and to return an error condition in the Status field when the Status field does not indicate "Success". When the MIB attribute indicates a specific operation, it confirms that the operation has been performed.

Also, the MLME and the SME may exchange various MLME_GET/SET primitives through an MLME Service Access Point (MLME_SAP). In addition, various PLME_GET/SET primitives may be exchanged between the PLME and the SME through a PLME_SAP, and exchanged between the MLME and the PLME through an MLME-PLME_SAP.

Link Setup Process

Figure 3:
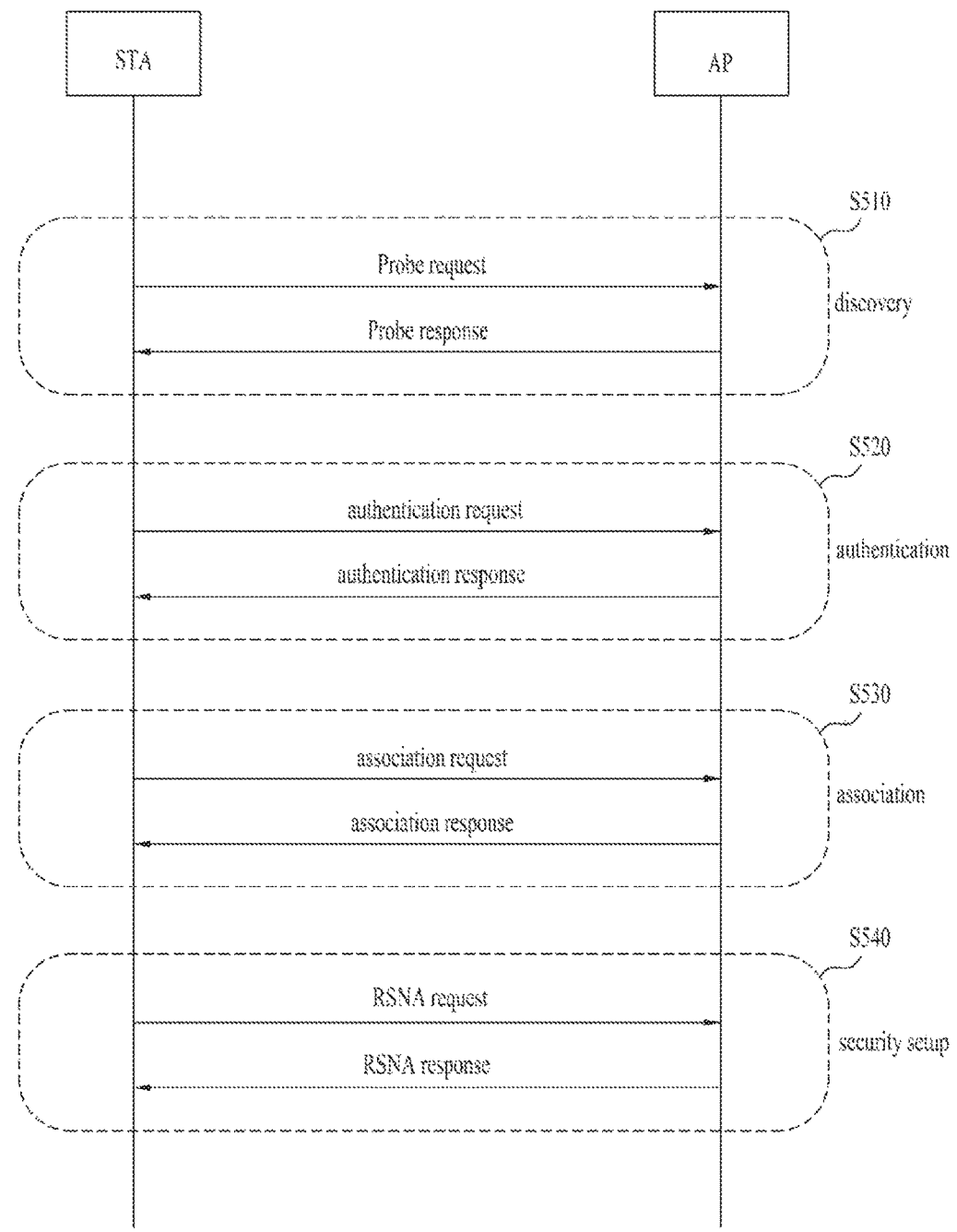
FIG. 3 illustrates a general link setup procedure.

FIG. 3 is a flowchart explaining a general link setup process according to an exemplary embodiment of the present invention.

In order to allow an STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 3.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 3 is a flowchart illustrating a network discovery action including an active scanning process. In the case of the active scanning, an STA configured to perform scanning transmits a probe request frame and waits for a response to the probe request frame, such that the STA can move between channels and at the same time can determine which Access Point (AP) is present in a peripheral region. A responder transmits a probe response frame, acting as a response to the probe request frame, to the STA having transmitted the probe request frame. In this case, the responder may be an STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 3, the scanning action may also be carried out using passive scanning AN STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a Quality of Service (QoS) map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an Extensible Authentication Protocol over LAN (EAPOL) frame. In addition, the security setup process may also be carried out according to other security schemes not defined in IEEE 802.11 standards.

Medium Access Mechanism

In the IEEE 802.11-based WLAN system, a basic access mechanism of Medium Access Control (MAC) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 4:
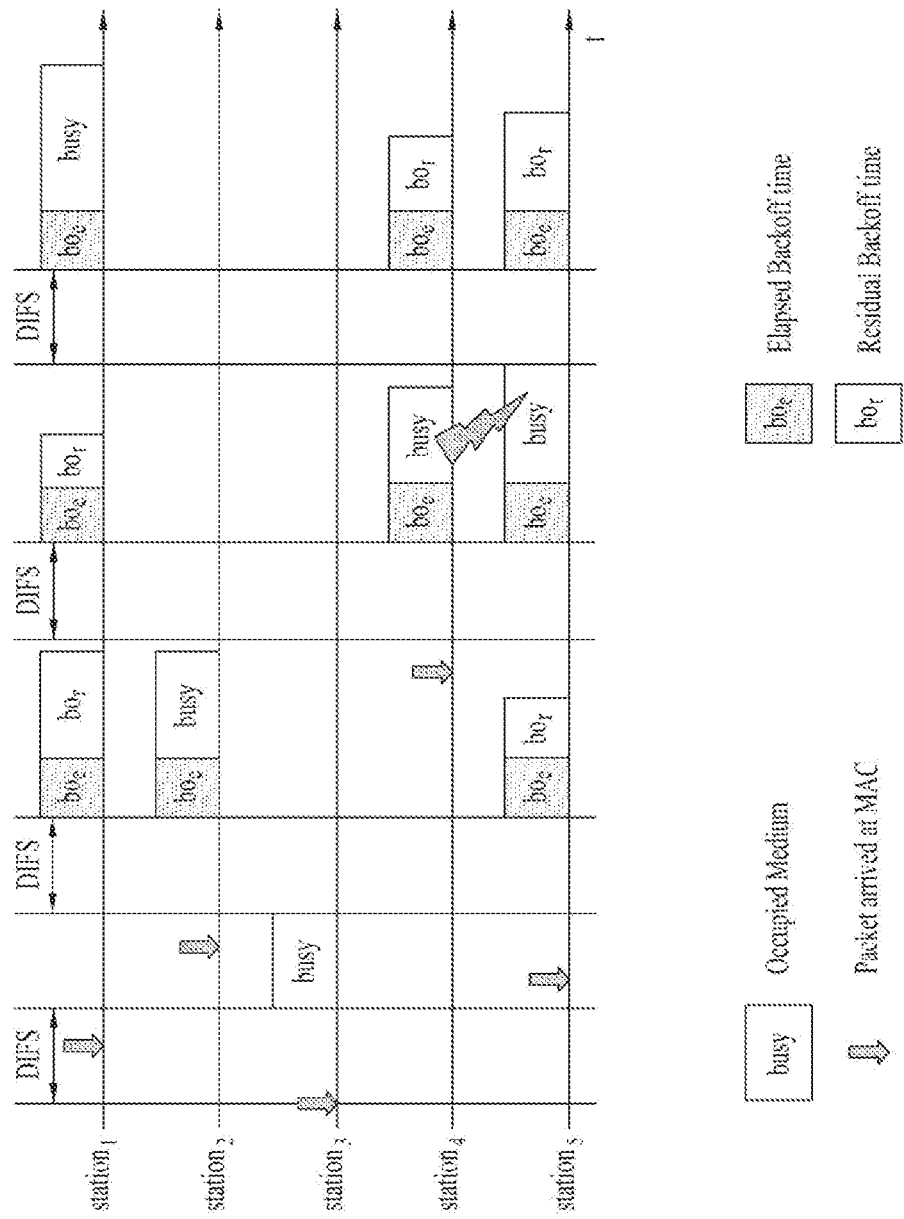
FIG. 4 illustrates a backoff procedure.

FIG. 4 is a conceptual diagram illustrating a backoff process.

Operations based on a random backoff period will hereinafter be described with reference to FIG. 4. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count has a value of a Packet Number (PN), and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin Preferably, CW, CWmin, and CWmax are set to $2n-1$ (where n=0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 4, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 4 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 4 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. AN STA having received the NAV value may prohibit medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

Figure 5:
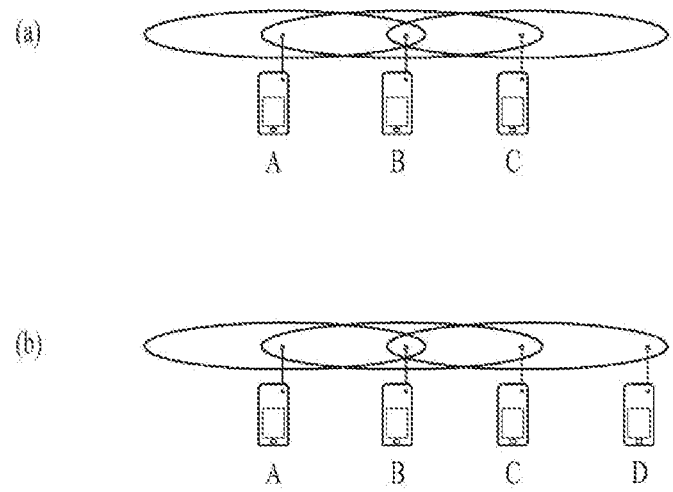
FIG. 5 is an explanatory diagram of a hidden node and an exposed node.

FIG. 5 is a conceptual diagram illustrating a hidden node and an exposed node.

FIG. 5(*a*) exemplarily shows the hidden node. In FIG. 5(*a*), STA A communicates with STA B, and STA C has information to be transmitted. In FIG. 5(*a*), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 5(*b*) exemplarily shows an exposed node. In FIG. 5(*b*), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 6:
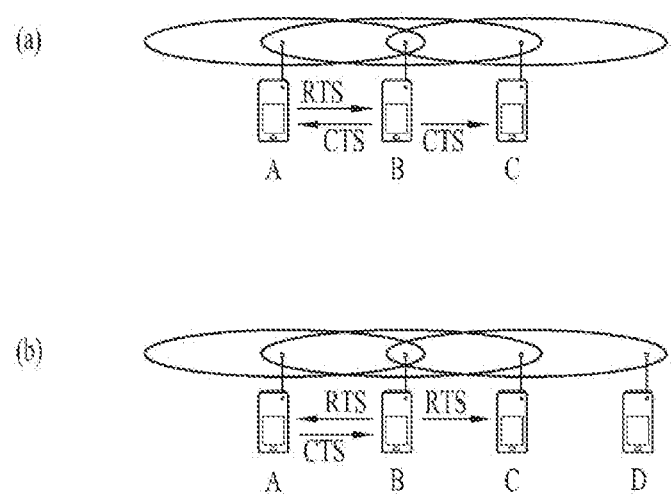
FIG. 6 is an explanatory diagram of RTS and CTS.

FIG. 6 is a conceptual diagram illustrating Request To Send (RTS) and Clear To Send (CTS).

In order to efficiently utilize the collision avoidance mechanism under the above-mentioned situation of FIG. 5, it is possible to use a short signaling packet such as RTS and CTS. RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 6(*a*) exemplarily shows the method for solving problems of the hidden node. In FIG. 6(*a*), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 6(*b*) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the Reception (Rx) state and the Transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a Power Management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

The AP may transmit a beacon frame to STAs in a BSS at predetermined intervals. The beacon frame may include a traffic indication map (TIM) information element. The TIM information element may include information indicating that the AP has buffered traffic for STAs associated therewith and will transmit frames. TIM elements include a TIM used to indicate a unitcast frame and a delivery traffic indication map (DTIM) used to indicate a multicast or broadcast frame.

Figure 7:
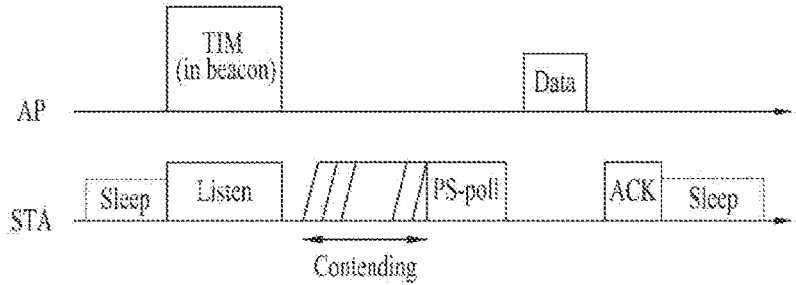
FIGS. 7 to 9 are explanatory diagrams of operation of an STA that has received TIM.
Figure 8:
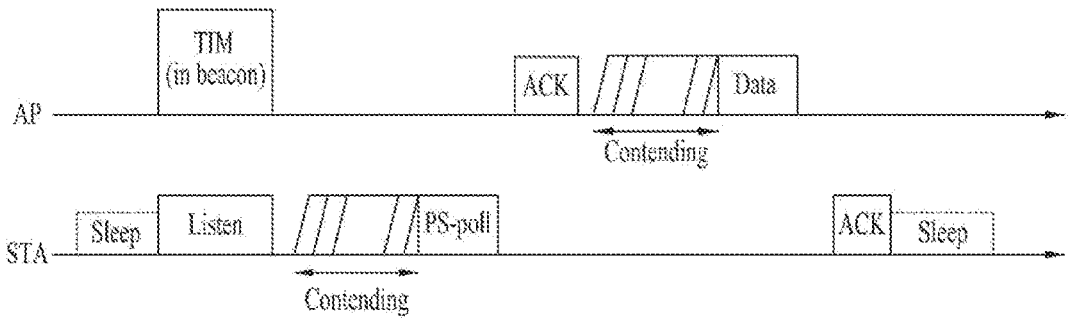
Figure 9:
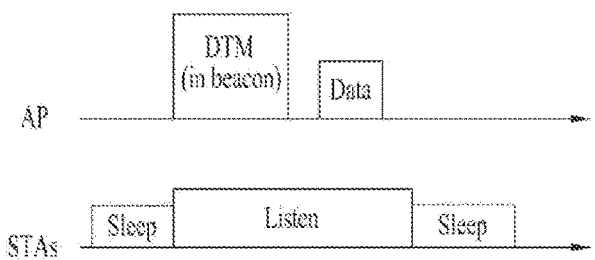

FIGS. 7 to 9 are conceptual diagrams illustrating detailed operations of the STA having received a Traffic Indication Map (TIM).

Referring to FIG. 7, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 7, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 8.

The STA operations of FIG. 8 in which the STA is switched from the sleep state to the awake state, receives a TIM from the AP, and transmits the PS-Poll frame to the AP through contention are identical to those of FIG. 7. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 9 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

Frame Structure

Figure 10:
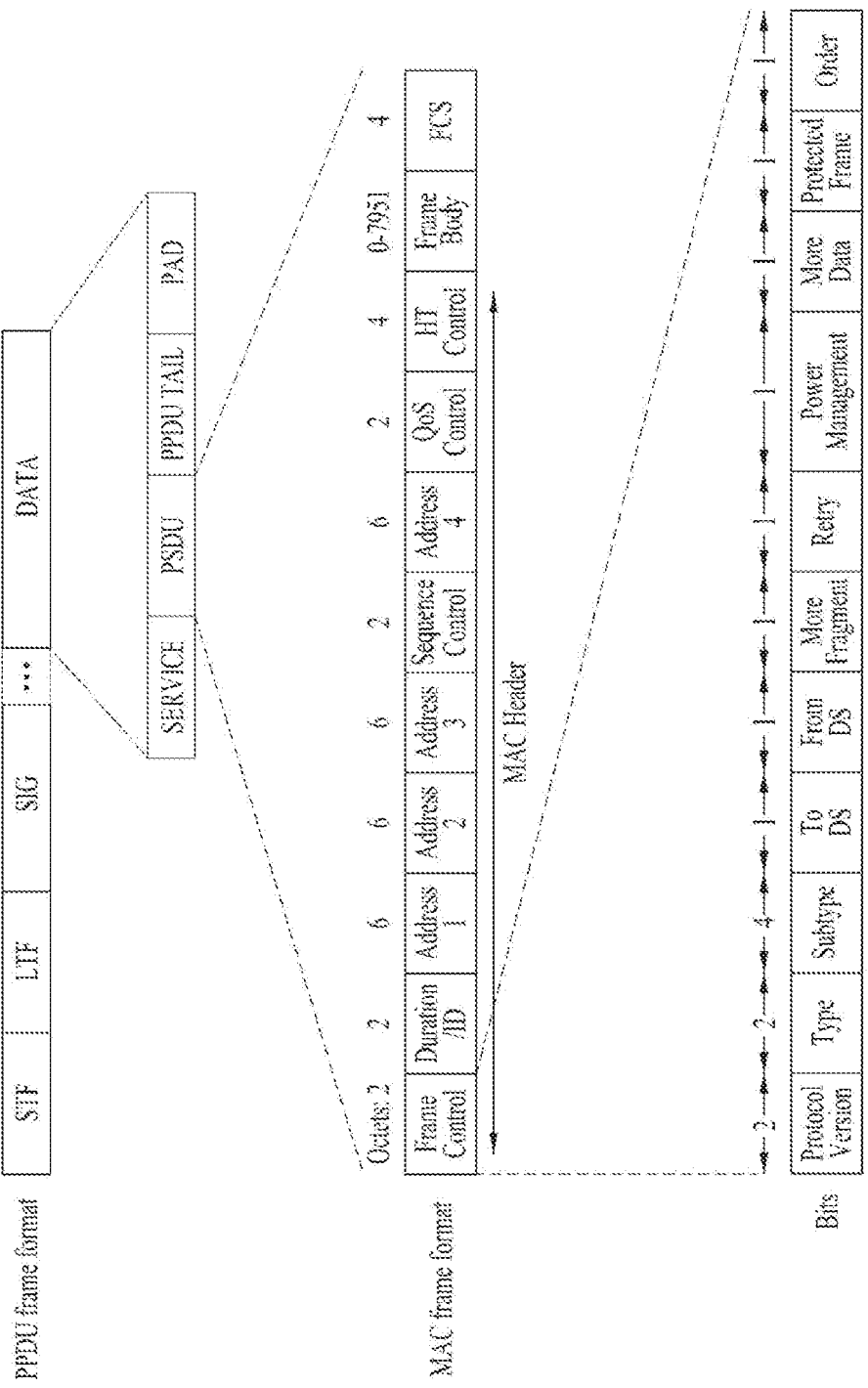
FIG. 10 is an explanatory diagram of an exemplary frame structure used in an IEEE 802.11 system.

FIG. 10 is an explanatory diagram of an exemplary frame structure used in an IEEE 802.11 system.

A PPDU (Physical Layer Protocol Data Unit) frame format may include an STF (Short Training Field), an LTF (Long Training Field), a SIG (SIGNAL) field and a data field. The most basic (e.g., non-HT (High Throughput)) PPDU frame format may include only an L-STF (Legacy-STF), an L-LTF (Legacy-LTF), a SIG field and a data field.

The STF is a signal for signal detection, AGC (Automatic Gain Control), diversity selection, accurate time synchronization, etc., and the LTF is a signal for channel estimation, frequency error estimation, etc. The STF and LTF may be collectively called a PLCP preamble. The PLCP preamble may be regarded as a signal for OFDM physical layer synchronization and channel estimation.

The SIG field may include a RATE field and a LENGTH field. The RATE field may include information about modulation and coding rates of data. The LENGTH field may include information about the length of data. In addition, the SIG field may include a parity bit, a SIG TAIL bit, etc.

The data field may include a SERVICE field, a PSDU (Physical layer Service Data Unit) and a PPDU TAIL bit. The data field may also include padding bits as necessary. Some bits of the SERVICE field may be used for synchronization of a descrambler at a receiving end. The PSDU corresponds to an MPDU (MAC Protocol Data Unit) defined in the MAC layer and may include data generated/used in a higher layer. The PPDU TAIL bit may be used to return an encoder to state 0. The padding bits may be used to adjust the length of the data field to a predetermined unit.

The MPDU is defined depending on various MAC frame formats, and a basic MAC frame includes a MAC header, a frame body and an FCS (Frame Check Sequence). The MAC frame may be composed of the MPDU and transmitted/received through PSDU of a data part of the PPDU frame format.

The MAC header includes a frame control field, a duration/ID field, an address field, etc. The frame control field may include control information necessary for frame transmission/reception. The duration/ID field may be set to a time to transmit a relevant relevant frame.

The duration/ID field included in the MAC header may be set to a 16-bit length (e.g., B0 to B15). Content included in the duration/ID field may depend on frame type and sub-type, whether transmission is performed for a CFP (contention free period), QoS capability of a transmission STA and the like. (i) In a control frame corresponding to a sub-type of PS-Poll, the duration/ID field may include the AID of the transmission STA (e.g., through 14 LSBs) and 2 MSBs may be set to 1. (ii) In frames transmitted by a PC (point coordinator) or a non-QoS STA for a CFP, the duration/ID field may be set to a fixed value (e.g., 32768). (iii) In other frames transmitted by a non-QoS STA or control frames transmitted by a QoS STA, the duration/ID field may include a duration value defined per frame type. In a data frame or a management frame transmitted by a QoS STA, the duration/ID field may include a duration value defined per frame type. For example, B15=0 of the duration/ID field indicates that the duration/ID field is used to indicate a TXOP duration, and B0 to B14 may be used to indicate an actual TXOP duration. The actual TXOP duration indicated by B0 to B14 may be one of 0 to 32767 and the unit thereof may be microseconds (μs). However, when the duration/ID field indicates a fixed TXOP duration value (e.g., 32768), B15 can be set to 1 and B0 to B14 can be set to 0. When B14=1 and B15=1, the duration/ID field is used to indicate an AID, and B0 to B13 indicate one AID of 1 to 2007. Refer to the IEEE 802.11 standard document for details of Sequence Control, QoS Control, and HT Control subfields of the MAC header.

The frame control field of the MAC header may include Protocol Version, Type, Subtype, To DS, From DS, More Fragment, Retry, Power Management, More Data, Protected Frame and Order subfields. Refer to the IEEE 802.11 standard document for contents of the subfields of the frame control field.

Figure 11:
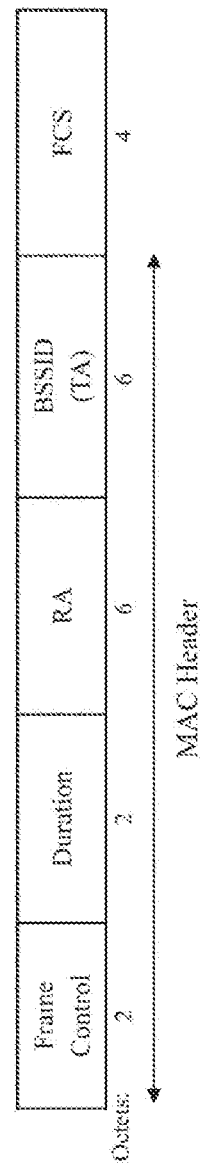
FIG. 11 illustrates a contention free (CF)-END frame.
Figure 12:
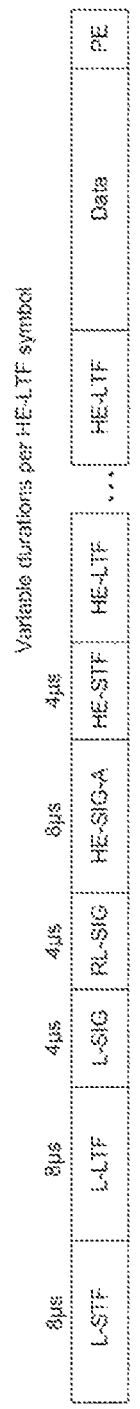
FIGS. 12 to 15 illustrate HE PPDUs.
Figure 13:
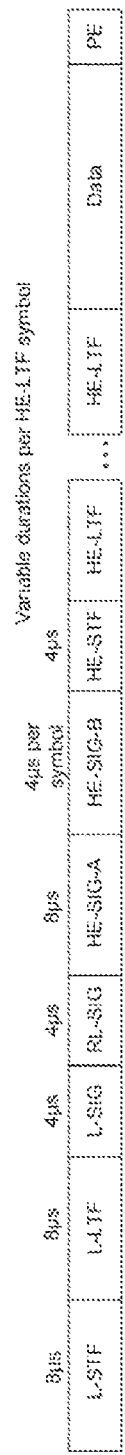
Figure 14:
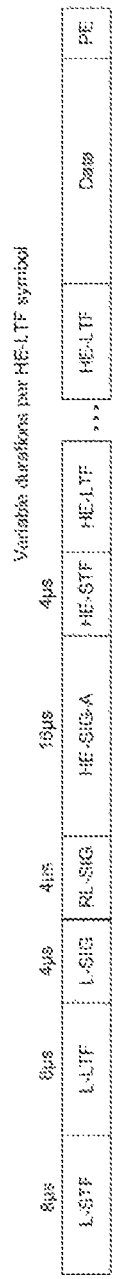
Figure 15:

FIG. 11 illustrates a CF (contention free)-END frame.

It is assumed that the CF-END frame is transmitted by a non-DMG (directional multi-gigabit, 11ad) STA for convenience of description. The CF-END frame may be transmitted to truncate a TXOP duration. Accordingly, a duration field is set to 0 in the CF-END frame. An RA (Receiver Address) field may be set to a broadcast group address. A BSSID field may be set to an STA address included in a relevant AP. However, in the case of a CF-END frame in a non-HT or non-HT duplicate format, which is transmitted from a VHT STA to a VHT AP, an Individual/Group bit of the BSSID field may be set to 1.

Example of HE PPDU Structure

A description will be given of examples of an HE PPDU (High Efficiency Physical layer Protocol Data Unit) format in a wireless LAN system supporting 11ax.

FIGS. 12 to 15 illustrate HE PPDUs.

A HE-SIG A field is positioned after L-part (L-STF, L-LTF, and L-SIG). Similar to the L-part, the HE-SIG A field is repeated (duplicated) in a unit of 20 MHz. The HE-SIG A can be included in all HE PPDUs. On the contrary, HE SIG B can be omitted from an SU PPDU or a UL trigger-based PPDU (e.g., a UL PPDU transmitted based on a trigger frame).

The HE-SIG A includes common control information (e.g., BW, GI length, BSS color, CRC, Tail, etc.) on STAs. The HE-SIG A field includes information for interpreting HE PPDU. Hence, information included in the HE-SIG A field may vary depending on a format of HE PPDU (e.g., SU PPDU, MU PPDU, or trigger-based PPDU).

For example, (i) in case of the HE SU PPDU format, the HE-SIG A field can include at least one selected from the group consisting of a DL/DL indicator, a HE PPDU format indicator, BSS color, TXOP duration, BW (bandwidth), MCS, CP+LTF length, coding information, number of streams, STBC (e.g., whether or not STBC is used), transmission beamforming (TxBF) information, CRC, and Tail. In case of the HE SU PPDU format, HE-SIG B field can be omitted. (ii) In case of the HE MU PPDU format, the HE-SIG A field can include at least one selected from the group consisting of a DL/UL indicator, BSS color, TCOP duration, BW (bandwidth), MCS information of SIG B field, number of symbols of the SIG B field, HE LTF symbol number, an indicator indicating whether or not full band MU-MIMO is used, CP+LTF length, transmission beamforming (TxBF) information, CRC, and Tail. (iii) In case of HE trigger-based PPDU format, the HE-SIG A field can include at least one selected from the group consisting of a format indicator (e.g., indicating SU PPDU or trigger-based PPDU), BSS color, TXOP duration, BW, CRC, and Tail.

The HE SIG-A includes not only the common control information but also user allocation information (e.g., at least one selected from the group consisting of an STA identifier such as PAID, GID, and the like, information on allocated resource, and number of streams (Nsts)).

The BSS color information included in the HE-SIG A field corresponds to information for identifying BSS and has a length shorter than a length of a BSSID. For example, a BSSID has a length of 48 bits, whereas the BSS color information may have a length of 6 bits. An STA can determine whether or not a frame corresponds to an intra-BSS frame using the BSS color information. In particular, if the HE-SIG A field is decoded only, the STA can distinguish an intra BSS PPDU from an inter BSS PPDU via the BSS color information without decoding the whole of HE PPDU.

The HE-SIG B can be independently encoded in every 20 MHz channel unit. If the HE-SIG B is encoded in every 20 MHz channel unit, the HE-SIG B can be referred to as a HE-SIG B content channel.

According to one embodiment, if a bandwidth is not wider than 20 MHz, it may be able to transmit a single HE-SIG B content channel. If a bandwidth is wider than 20 MHz, channels of a size of 20 MHz may transmit either a first HE-SIG B content channel (hereinafter, HE-SIG B [1]) or a second HE-SIG B content channel (hereinafter, HE-SIG B [2]). For example, the HE-SIG B [1] and the HE-SIG B [2] can be transmitted in turn. An odd-numbered 20 MHz channel transmits the HE-SIG B [1] and an even-numbered 20 MHz channel transmits the HE-SIG B [2]. More specifically, in case of a 40 MHz bandwidth, the HE-SIG B [1] is transmitted on a first 20 MHz channel and the HE-SIG B [2] is transmitted on a second 20 MHz channel. In case of an 80 MHz bandwidth, the HE-SIG B [1] is transmitted on a first 20 MHz channel, the HE-SIG B [2] is transmitted on a second 20 MHz channel, the identical HE-SIG B [1] is repeatedly transmitted on a third 20 MHz channel, and the identical HE-SIG B [2] is repeatedly transmitted on a fourth 20 MHz channel. The HE-SIG B [1] and the HE-SIG B [2] are similarly transmitted on a 160 MHz bandwidth.

Meanwhile, content of the HE-SIG B [1] may differ from content of the HE-SIG B [2]. Yet, all of the HE-SIG B [1] have the same content. Similarly, all of the HE-SIG B [2] have the same content.

The HE-SIG B can include a common field and a user specific field. The common field may appear prior to the user specific field. The common field and the user specific field can be distinguished from each other in a bit unit rather than an OFDM symbol unit.

The common field of the HE-SIG B includes information on all STAs configured to receive PPDU on a corresponding bandwidth. The common field can include RU (resource unit) allocation information. For example, when four 20 MHz-channels constructing 80 MHz are respectively designated as [LL, LR, RL, RR], a common block for LL and RL is included in the common field of the HE-SIG B [1] and a common block for LR and RR can be included in the common field of the HE-SIG B [2].

The user specific field of the HE-SIG B can include a plurality of user fields. Each of a plurality of the user fields can include information on a specific STA configured to receive PPDU. For example, a user field can include at least one selected from the group consisting of a station ID, MCS per STA, stream number 9Nsts), coding (e.g., LDPC use indication), a DCM indicator, and transmission beamforming information, by which the present invention may be non-limited.

UL MU Transmission

Figure 16:
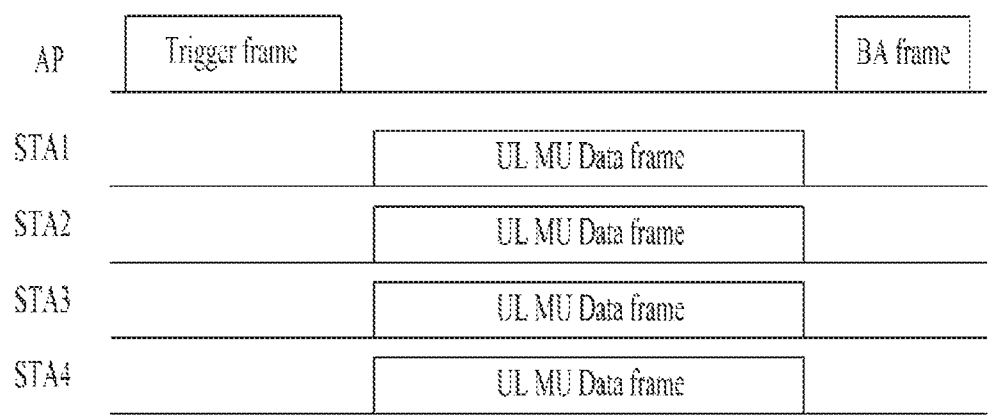
FIG. 16 is a diagram for explaining a situation that multiple users perform transmission in uplink.

FIG. 16 is an explanatory diagram of an uplink multi-user transmission situation according to an embodiment of the present invention.

As described above, an 802.11ax system may employ UL MU transmission. UL MU transmission may be started when an AP transmits a trigger frame to a plurality of STAs (e.g., STA1 to STA4), as illustrated in FIG. 16. The trigger frame may include UL MU allocation information. The UL MU allocation information may include at least one of resource position and size, STA IDs or reception STA addresses, MCS and MU type (MIMO, OFDMA, etc.). Specifically, the trigger frame may include at least one of (i) a UL MU frame duration, (ii) the number of allocations (N) and (iii) information per allocation. The information per allocation may include information per user (Per user Info). The information per allocation may include at least one of an AID (AIDs corresponding to the number of STAs are added in the case of MU), power adjustment information, resource (or tone) allocation information (e.g., bitmap), MCS, the number of streams (Nsts), STBC, coding and transmission beamforming information.

Figure 19:
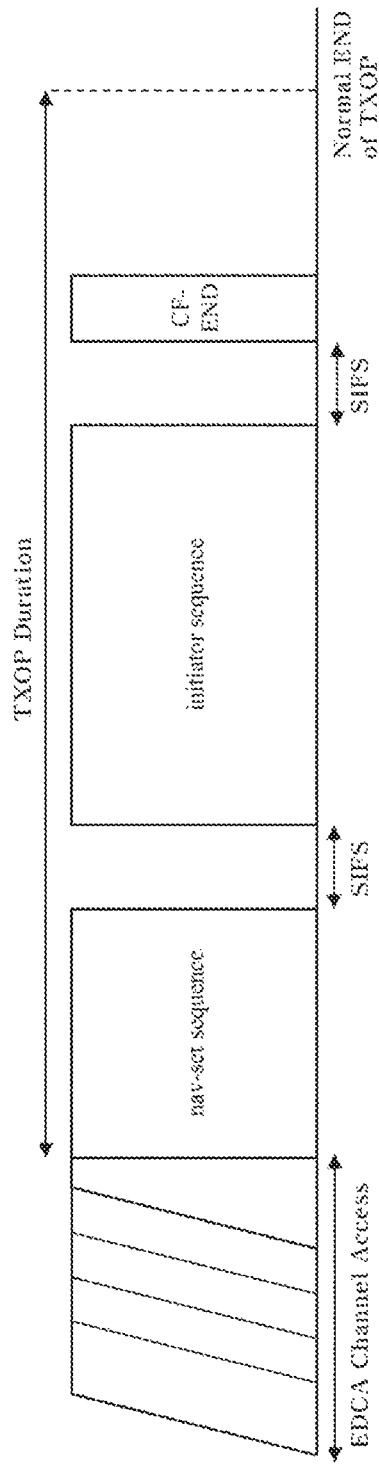
FIG. 19 illustrates an example of TXOP truncation.

As illustrated in FIG. 19, the AP may acquire TXOP to transmit the trigger frame through a contention procedure to access media. Accordingly, the STAs may transmit UL data frames in a format indicated by the AP after SIFS of the trigger frame. It is assumed that the AP according to an embodiment of the present invention sends an acknowledgement response to the UL data frames through a block ACK (BA) frame.

Figure 17:
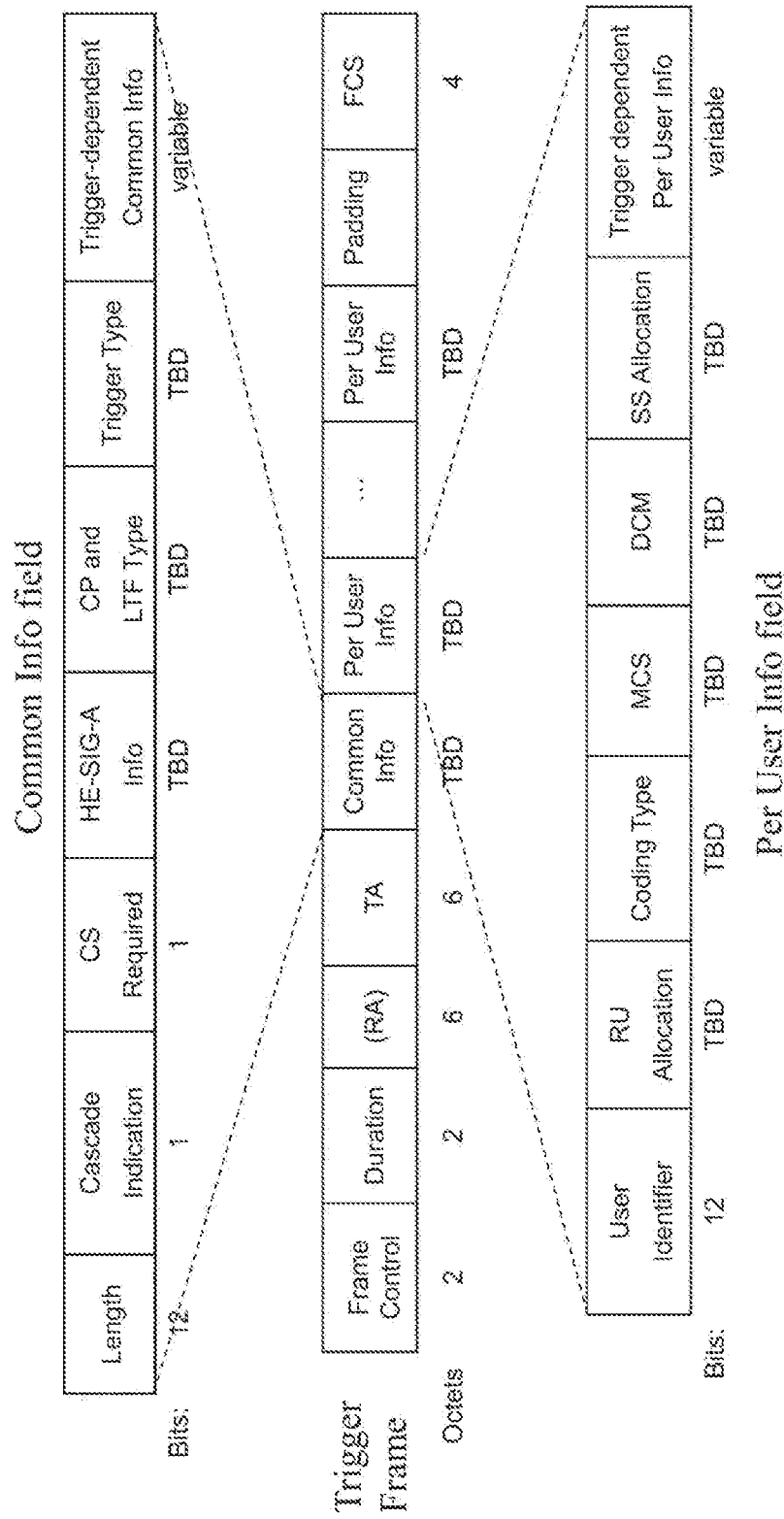
FIG. 17 illustrates an example of a trigger frame format.

FIG. 17 illustrates a trigger frame format according to an embodiment.

Referring to FIG. 17, the trigger frame may include at least one of a frame control field, a duration field, an RA (recipient STA address) field, a TA (transmitting STA address) field, a common information field, one or more Per User Info fields and FCS (Frame Check Sum). The RA field indicates the address or ID of a recipient STA and may be omitted according to embodiments. The TA field indicates the address of a transmitting STA.

The common information field may include at least one of a length subfield, a cascade indication subfield, an HE-SIG A information subfield, a CP/LTF type subfield, a trigger type subfield and a trigger-dependent common information subfield. The length subfield indicates the L-SIG length of a UL MU PPDU. The cascade indication indicates whether there is transmission of a subsequent trigger frame following the current trigger frame. The HE-SIG A information subfield indicates content to be included in the HE-SIG A of the UL MU PPDU. The CP/LTF type subfield indicates a CP and HE LTF type included in the UL MU PPDU. The trigger type subfield indicates the type of the trigger frame. The trigger frame may include common information specific to the type and information per user (Per User Info) specific to the type. For example, the trigger type may be set to one of a basic trigger type (e.g., type 0), beamforming report poll trigger type (e.g., type 1), MU-BAR (Multi-user Block Ack Request) type (e.g., type 2) and MU-RTS (multi-user ready to send) type (e.g., type 3). However the trigger type is not limited thereto. When the trigger type is MU-BAR, the trigger-dependent common information subfield may include a GCR (Groupcast with Retries) indicator and a GCR address.

The Per User Info field may include at least one of a user ID subfield, an RU allocation subfield, a coding type subfield, an MCS subfield, a DCM (dual sub-carrier modulation) subfield, an SS (spatial stream) allocation subfield and a trigger dependent Per User Info subfield. The user ID subfield indicates the AID of an STA which will use a corresponding resource unit to transmit MPDU of the UL MU PPDU. The RU allocation subfield indicates a resource unit used for the STA to transmit the UL MU PPDU. The coding type subfield indicates the coding type of the UL MU PPDU transmitted by the STA. The MCS subfield indicates the MCS of the UL MU PPDU transmitted by the STA. The DCM subfield indicates information about double carrier modulation of the UL MU PPDU transmitted by the STA. The SS allocation subfield indicates information about spatial streams of the UL MU PPDU transmitted by the STA. In the case of MU-BAR trigger type, the trigger-dependent Per User Info subfield may include BAR control and BAR information.

HT Control Field

A MAC header includes a HT control field. The HT control field can be configured by various formats. For example, the HT control field can be configured by one selected from the group consisting of HT variant, VHT variant, and HE variant. The configuration of the HT control field configured for each format is shown in Table 1.

TABLE 1

| Variant | Bit 0 (value) | Bit 1 (value) | Bit 2-29 | Bit 30 | Bit 31 |
| --- | --- | --- | --- | --- | --- |
| HT variant | VHT (0) | | HT Control Middle | AC Constraint | RDG/More PPDU |
| VHT variant | VHT (1) | HE (0) | VHT Control Middle | AC Constraint | RDG/More PPDU |
| HE variant | VHT (1) | HE (1) | Aggregated Control | | |

A VHT Control Middle subfield included in a VHT Variant HT Control field can include MRQ, MSI/STBC, MFSI/GID-L, MFB, GID-H, Coding Type, FB Tx Type, and Unsolicited MFB.

An Aggregated Control subfield included in a HE Variant HT Control field can include a plurality of control subfields and a padding bit. Each of a plurality of the control subfields includes a control ID of 4 bits and control information. The control ID indicates a type of information included in the control information and a length of the control information.

If the control ID is set to 0, it indicates UL MU response scheduling. If the control ID is set to 0, the control information includes scheduling information for a HE trigger-based PPDU that carries an immediate acknowledgement. In this case, the immediate acknowledgement can be transmitted in response to a soliciting A=MPDU. And, the control information can include a UL PPDU length and RU allocation information.

If the control ID is set to 1, it indicates receive operation mode indication. In this case, the control information includes control information on a receive operation mode of an STA transmitting a frame including corresponding information. The control information can include the maximum number of spatial streams capable of being received by an STA and information on an operation bandwidth supported by the STA.

If the control ID is set to 2, it indicates HE link adaptation. In this case, the control information can include the number of preferred spatial streams for the link adaptation and information on an MCS index.

NAV (Network Allocation Vector)

A NAV may be understood as a timer for protecting TXOP of a transmitting STA (e.g., TXOP holder). An STA may not perform channel access during a period in which a NAV configured in the STA is valid so as to protect TXOP of other STAs.

A current non-DMG STA supports one NAV. An STA which has received a valid frame can update the NAV through the duration field of the PSDU (e.g., the duration field of the MAC header). When the RA field of the received frame corresponds to the MAC address of the STA, however, the STA does not update the NAV. When a duration indicated by the duration field of the received frame is greater than the current NAV value of the STA, the STA updates the NAV through the duration of the received frame.

Figure 18:
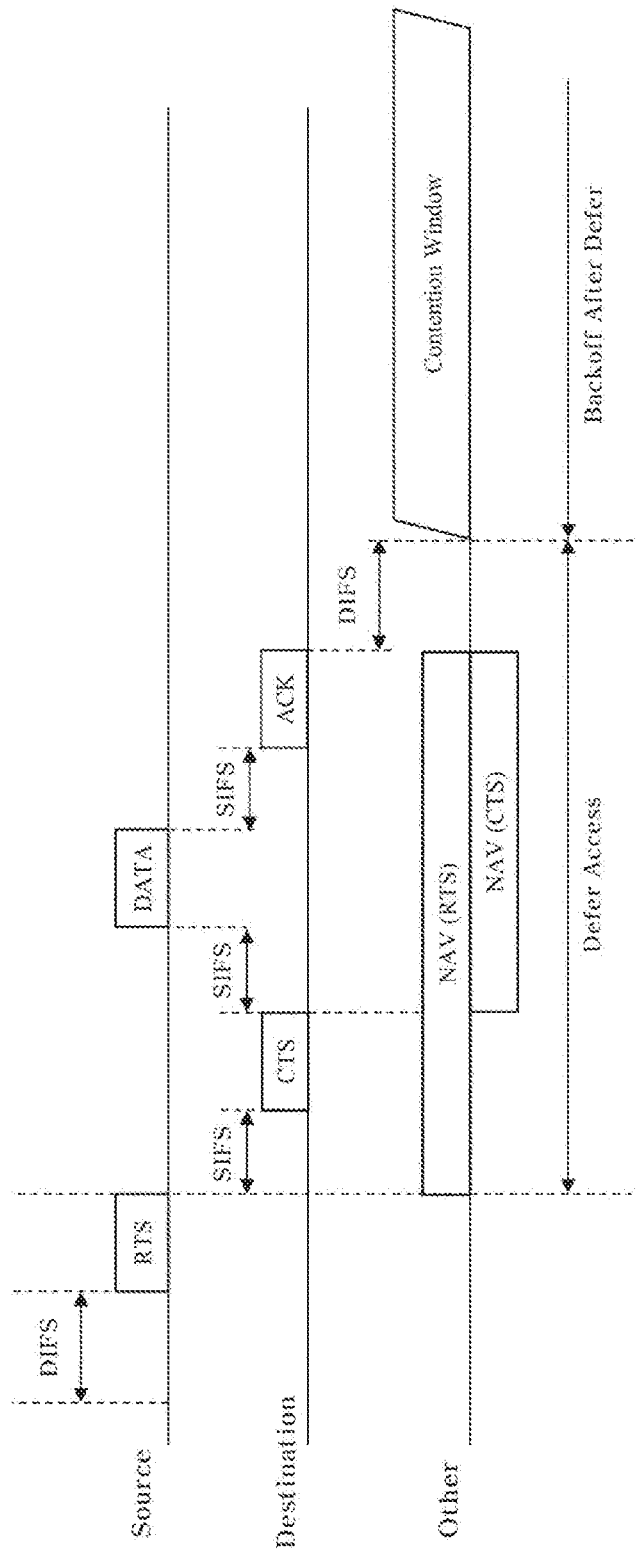
FIG. 18 illustrates an example of NAV setting.

FIG. 18 illustrates an example of NAV setting.

Referring to FIG. 18, a source STA transmits an RTS frame and a destination STA transmits CTS frame. As described above, the destination STA designated as a recipient through the RTS frame does not set a NAV. Some of other STAs may receive the RTS frame and set NAVs and others may receive the CTS frame and set NAVs.

If the CTS frame (e.g., PHY-RXSTART.indication primitive) is not received within a predetermined period from a timing when the RTS frame is received (e.g., PHY-RXEND-.indication primitive for which MAC corresponds to the RTS frame is received), STAs which have set or updated NAVs through the RTS frame can reset the NAVs (e.g., 0). The predetermined period may be (2*aSIFSTime+CTS_Time+aRxPHYStartDelay+2*aSlotTime). The CTS_Time may be calculated on the basis of the CTS frame length indicated by the RTS frame and a data rate.

Although FIG. 18 illustrates setting or update of a NAV through the RTS frame or CTS frame for convenience, NAV setting/resetting/update may be performed on the basis of duration fields of various frames, for example, non-HT PPDU, HT PPDU, VHT PPDU and HE PPDU (e.g., the duration field of the MAC header of the MAC frame). For example, if the RA field of the received MAC frame does not correspond to the address of an STA (e.g., MAC address), the STA may set/reset/update the NAV.

FIG. 19 illustrates an example of TXOP truncation.

A TXOP holder STA may indicate to truncate TXOP by transmitting a CF-END frame. AN STA can reset the NAV (e.g., set the NAV to 0) upon reception of a CF-END frame or CF-END+CF-ACK frame.

When an STA that has acquired channel access through EDCA empties a transmission queue thereof, the STA can transmit a CF-END frame. The STA can explicitly indicate completion of TXOP thereof through transmission of the CF-END frame. The CF-END frame may be transmitted by a TXOP holder. A non-AP STA that is not a TXOP holder cannot transmit the CF-END frame. A STA which has received the CF-END frame resets the NAV at a time when a PPDU included in the CF-END frame is ended.

Referring to FIG. 19, an STA that has accessed a medium transmits a sequence (e.g., RTS/CTS) for NAV setting.

After SIFS, a TXOP holder (or TXOP initiator) and a TXOP responder transmit and receive PPDUs (e.g., initiator sequence). The TXOP holder truncates a TXOP by transmitting a CF-END frame when there is no data to be transmitted within the TXOP.

STAs which have received the CF-END frame reset NAYS thereof and can start contending for medium access without delay.

As described above, a TXOP duration is set through the duration field of the MAC header in the current wireless LAN system. That is, a TXOP holder (e.g., Tx STA) and a TXOP responder (e.g., Rx STA) include whole TXOP information necessary for transmission and reception of frames in duration fields of frames transmitted and received therebetween and transmit the frames. Third party STAs other than the TXOP holder and the TXOP responder check the duration fields of frames exchanged between the TXOP holder and the TXOP responder and sets/updates NAVs to defer use of channels until NAV periods.

Indication of TXOP Duration Via HE-SIG a

In an 11ax system supporting the HE PPDU, the third party STAs cannot decode an MPDU included in a UL MU PPDU even when they receive the UL MU PPDU if the UL MU PPDU does not include the HE-SIG B. If the third party STAs cannot decode the MPDU, the third party STAs cannot acquire TXOP duration information (e.g., duration field) included in the MAC header of the MPDU. Accordingly, it is difficult to correctly perform NAV setting/update.

Even when an HE PPDU frame including the HE-SIG B is received, if the HE-SIG B structure is encoded per STA and is designed such that a STA can read only HE-SIG B content allocated to that STA, the third party STAs cannot decode a MAC frame (e.g., an MPDU in the HE PPDU corresponding to other STAS) transmitted and received by other STAs. Accordingly, the third party STAs cannot acquire TXOP information in this case.

In order to solve the abovementioned problems, the present invention proposes a method for an STA to transmit the TXOP duration information in a manner of including the TXOP duration information in the HE-SIG A. As mentioned in the foregoing description, 15 bits (e.g., B0~14) of the duration field of the MAC header may indicate the duration information and may indicate about maximum 32.7 ms (0~32767 us). If the duration information of 15 bits included in the duration field of the MAC header is transmitted in a manner of being included in the HE-SIG A as it is, an 11ax third party STA is able to properly perform NAV configuration/update. However, signaling overhead of the HE-SIG A considerably increases. Although 15 bits are considered as a relatively small size in MPDU for transmitting payload in MAC layer, since the HE-SIG A for transmitting common control information corresponds to a compactly designed field in a physical layer, if 15 bits increase in the HE-SIG A, it corresponds to relatively big signaling overhead.

Hence, the present invention proposes a method of efficiently indicating TXOP duration to minimize the overhead of the HE-SIG A. And, the present invention proposes an operation of transmitting and receiving a frame based on TXOP duration newly defined in the HE-SIG A. In the following, for clarity, a duration field included in a MAC header is referred to as MAC duration.

A value set to NAV of a $3^{rd}$ STA can be interpreted as TXOP duration for a TXOP holder/responder. For example, in the aspect of the TXOP holder/responder, a value of the Duration field may correspond to TXOP for transmitting and receiving a frame. In the aspect of the $3^{rd}$ STA, the value of the Duration field may correspond to NAV value. Hence, an operation of setting/updating NAV, which is set/updated by $3^{rd}$ STAs, is to set NAV as much as TXOP for the TXOP holder/responder. In particular, for clarity, the operation of setting/updating NAV can be referred to as an operation of setting/updating TXOP. And, such a terminology as TXOP Duration can be simply referred to as Duration or TXOP. In some cases, the TXOP Duration is used to indicate a field (e.g., TXOP Duration field in HE-SIG A) in a frame or an actual TXOP Duration value.

Indexes assigned to the following proposals are assigned for clarity. Proposals having a different index can be combined with each other to implement an invention. Or, each of the proposals can be implemented as an individual invention.

Proposal 1

If a TXOP duration field is included in HE-SIG-A of HE PPDU, it is necessary to define a length, a value, a granularity, and the like of a TXOP duration indicated by the TXOP duration filed. For example, it is necessary to determine (1) a size, (2) a maximum value, (3) a granularity, and the like in consideration of capacity of the HE-SIG-A and the granularity of the TXOP duration. In this case, the granularity can also be represented in a unit of scaling (or scaling factor) or TXOP duration.

(1) Size of TXOP Duration Field

Capacity of HE-SIG-A is explained. In case of a HE SU PPDU format, remaining bits of 13 bits (e.g., bits available because the use of a different usage is not defined) exist. In case of a HE MU PPDU, remaining bits of 14 bits exist. In case of a HE triggered-based PPDU, remaining bits equal to or greater than 14 bits exist.

For example, in the HE-SIG A field, fields of which a size is not determined may correspond to a BW field (equal to or greater than 2 bits), a spatial reuse field, a TXOP duration field, and the like in the HE-MU PPDU format.

Similar to a legacy system, a currently discussed different HE-SIG A field may correspond to a reserved field of 1 bit, an STBC field of 1 bit in the HE MU PPDU format.

In particular, a length of the TXOP duration field can be restricted to a certain size (e.g., 5~7 bits) in consideration of other fields of the HE-SIG A.

Due to the size restriction, it is preferable for the TXOP duration field to have a granularity greater than a granularity (e.g., 1 us) used in MAC duration. In particular, although the TXOP duration field is configured by a size smaller than a size of the MAC duration, the TXOP duration field may have a greater granularity.

(2) Maximum Value of TXOP Duration

As mentioned in the foregoing description, a MAC duration field (e.g., 15 bits, 1 us unit) can cover up to 32 ms. In a default EDCA parameter set, a TXOP limit corresponds to about 4 ms. Yet, an AP can configure an EDCA parameter set via a beacon.

An AP may configure TXOP duration to be longer than 4 ms using a TXOP duration field (e.g., 8 or 16 ms). In particular, it is necessary for the AP to configure the TXOP duration to be longer in an MU TXOP procedure or a cascade structure.

Meanwhile, when LAA (licensed assisted access) is performed to use an unlicensed band in a cellular system (e.g., 3GPP), a maximum TXOP is regulated by 8 ms and WiFi requires a very long TXOP (e.g. ~10 ms) for a sounding packet. According to the LBT (listen before talk) requirements of Europe, maximum channel occupancy time may correspond to 10 ms. According to LTE-U corresponding to an LTE system operating on an unlicensed band, maximum on-state duration corresponds to 20 ms.

When the abovementioned design elements are considered, it is preferable for a size of maximum TXOP duration capable of being indicated by the HE-SIG A field to have 8 ms (or 16 ms).

(3) Granularity of TXOP Duration

If a relatively small single granularity is used only, many bits are required for a TXOP duration field (e.g., 8~15 bits).

On the contrary, if a relatively big single granularity is used only, an over-protection problem frequently occurs on STAs (e.g., third party), thereby degrading efficiency of channel use (NAV is configured by an unnecessarily big TXOP duration value).

FIG. 20 illustrates a TXOP duration configuration of a small granularity and a TXOP duration configuration of a large granularity. FIG. 20(a) illustrates a TXOP duration configuration for DL transmission. Specifically, FIG. 20(a) illustrates a case that STAs transmit UL MU BA in response to DL MU PPDU transmitted by an AP. FIG. 20(b) illustrates a TXOP duration configuration for UL transmission. Specifically, FIG. 20(b) illustrates a case that STAs transmit a UL MU frame based on a trigger frame transmitted by an AP and the AP transmits DL MU BA. Referring to FIGS. 20(a) and (b), a size of an error between MAC duration and TXOP duration configured by a TXOP duration field of HE-SIG A is relatively small when a small granularity is used. When a large granularity is used, the size of the error is relatively big. In particular, if a large granularity is used, it may cause over-protection equal to or greater than actually required TXOP.

Meanwhile, packets of a relatively small size (e.g., ACK, BA, MU BA, etc.) are explained. In general, ACK or BA is positioned at the last frame of TXOP. Duration of the ACK, the BA, and/or the MU BA may vary depending on a data rate. For example, a length of UL MU BA corresponds to 422.4 us in a low data rate (e.g., MCS0, 26 tones).

If a small granularity (e.g., less than 32 us) is used for at least a part of the ACK, the BA, and/or the MU BA, it is able to efficiently solve an excessive protection problem caused by third party STAs.

Hence, it is necessary for TXOP duration to support a small packet having a small granularity (e.g., 16 or 32 us). As one of methods of supporting a packet of small capacity, it may consider using multiple granularities (e.g., small and large) for TXOP.

According to one embodiment of the present invention, it may use multiple units (e.g., multi-granularity) for TXOP duration. The number of multiple units may correspond to 2 (or 4), by which the present invention may be non-limited. If the number of multiple units corresponds to 2, for clarity, each of the units can be referred to as a small unit and a large unit, respectively. Actual sizes of the small unit and the large unit may vary according to a size (e.g., 5, 6, or 7 bits) of a TXOP duration field. For example, the small unit (e.g., 16 or 32 us) can be used for indicating duration less than 512 us and the large unit (e.g., 512 or 256 us) can be used for indicating TXOP duration ranging from 512 us to a maximum TXOP duration value. For example, the small unit can be used for the aforementioned UL MU BA (e.g., about 400 us long) of the lowest data rate.

Table 2 illustrates a small unit and a large unit according to a size of a TXOP duration field.

TABLE 2

| | TXOP duration Field size (bits) | Max value of TXOP duration (us) | Small unit (us) | Large unit (us) |
|---|---|---|---|---|
| Option 1-1 | 5 | 8192 | 16 | 512 |
| Option 1-2 | | | 32 | |
| Option 2-1 | 6 | 8192 | 16 | 256 |
| Option 2-2 | | 16384 | | 512 |
| Option 3-1 | 7 | 8832 | 4/8/16 | 256 |
| Option 3-2 | | 8704 | 8 | |
| Option 3-3 | | 12616 | 16 | |

In the following, for clarity, assume that a size of a TXOP duration field corresponds to 7 bits. A first bit of the TXOP duration field (7 bits) is represented by 'B0' and the last bit of the field is represented by 'B6'.

(i) Example of Option 3-1 in Table 2: 7-Bit Field Size, 4 Units (4, 8, 16, 256 Us)

Table 3 illustrates a TXOP duration value according to a value (e.g., TXOP index) of a TXOP duration field when the TXOP duration field corresponds to 7 bits (e.g., B0~B6) and total 4 duration units (4 us, 8 us, 16 us, and 256 us) are used (option 3-1 in Table 2). For example, 4 us, 8 us, and 16 us may correspond to small units and 256 us may correspond to a large unit.

TABLE 3

| B0B1 | B2~B6 | TXOP duration range | Unit | TXOP duration value |
|---|---|---|---|---|
| 00 | 00000~11111 | 0 us~124 us | 4 us | (4 * value of (B2~B6)) us |
| 01 | 00000~11111 | 128 us~376 us | 8 us | (128 + 8 * value (B2~B6)) us |
| 10 | 00000~11111 | 384 us~880 us | 16 us | (384 + 16 * value of (B2~B6)) us |
| 11 | 00000~11111 | 896 us~8832 us | 256 us | (896 + 256 * of (B2~B6)) us |

Referring to Table 3, B0B1 indicates one of 4 units (or granularities) of duration. For example, B0B1=00 indicates 4 us, B0B1=01 indicates 8 us, B0B1=10 indicates 16 us, and B0B1=11 indicates 256 us.

In particular, an STA can calculate a TXOP duration value based on B0~B6 values of the TXOP duration field of HE-SIG A field. For example, if B0B1 corresponds to 00, a TXOP duration value corresponds to (4*value of (B2~B6)) us. If B0B1 corresponds to 01, a TXOP duration value corresponds to (128+8*value of (B2~B6)) us. If B0B1 corresponds to 10, a TXOP duration value corresponds to (384+16*value of (B2~B6)) us. If B0B1 corresponds to 11, a TXOP duration value corresponds to (896+256*value of (B2~B6)) us.

(ii) Example of Option 3-2 in Table 2: 7-Bit Field Size, 2 Units (8, 256 Us

Table 4 illustrates a TXOP duration value according to a value (e.g., TXOP index) of a TXOP duration field when the TXOP duration field corresponds to 7 bits (e.g., B0~B6), a small unit corresponds to 8 us, and a large unit corresponds to 256 us (Option 3-2 in Table 2).

TABLE 4

| B0B1 | B2~B6 | TXOP duration range | Unit | TXOP duration value |
|---|---|---|---|---|
| 00 | 00000~11111 | 0 us~248 us | 8 us | (8 * value of (B2~B6)) us |
| 01 | 00000~11111 | 256 us~506 us | | (256 + 8 * value (B2~B6)) us |
| 10 | 00000~11111 | 512 us~760 us | | (512 + 8 * value of (B2~B6)) us |
| 11 | 00000~11111 | 768 us~8704 us | 256 us | (768 + 256 * of (B2~B6)) us |

Referring to Table 4, B0B1 indicates one of 2 units (or granularities) of duration. For example, B0B1=00 indicates 8 us and B2~B3 (00000)=0, B0B1=01 indicates 8 us and B2~B3 (00000)=256, B0B1=10 indicates 8 us and B2~B3 (00000)=512, and B0B1=11 indicates 256 us and B2~B3 (00000)=768.

In particular, an STA can calculate a TXOP duration value based on B0~B6 values of the TXOP duration field of HE-SIG A field. For example, if B0B1 corresponds to 00, a TXOP duration value corresponds to (8*value of (B2~B6)) us. If B0B1 corresponds to 01, a TXOP duration value corresponds to (256+8*value of (B2~B6)) us. If B0B1 corresponds to 10, a TXOP duration value corresponds to (512+8*value of (B2~B6)) us. If B0B1 corresponds to 11, a TXOP duration value corresponds to (768+256*value of (B2~B6)) us.

(iii) Example of Option 3-3 in Table 2: 7-Bit Field Size, 2 Units (16, 256 Us)

Table 5 illustrates a TXOP duration value according to a value (e.g., TXOP index) of a TXOP duration field when the TXOP duration field corresponds to 7 bits (e.g., B0~B6), a small unit corresponds to 16 us, and a large unit corresponds to 256 us (Option 3-3 in Table 2).

TABLE 5

| B0 | B1~B6 | TXOP duration range | Unit | TXOP duration value |
|---|---|---|---|---|
| 0 | 000000~111111 | 0 us~1008 us | 16 us | (16 * value of (B1~B6)) us |
| 1 | 000000~111111 | 1024 us~12616 us | 256 us | (1024 + 256 * value (B1~B6)) us |

Referring to Table 5, B0 indicates a unit (or granularity) of duration. For example, B0=0 indicates 16 us corresponding to a small unit and B0=1 indicates 256 us corresponding to a large unit. In particular, an STA can calculate a TXOP duration value based on B0~B6 values of the TXOP duration field of HE-SIG A field. For example, if B0 corresponds to 0, a TXOP duration value corresponds to (16*value of (B1~B6)) us. If B0 corresponds to 1, a TXOP duration value corresponds to (1024+256*value of (B1~B6)) us.

Meanwhile, an STA may obtain a TXOP duration value from a predefined lookup table. For clarity, lookup tables corresponding to tables 3 and 4 are omitted.

(iv) Example of Option 4: 7-Bit Field Size, 1 Unit (48 Us)

According to a different embodiment of the present invention, as shown in Table 6, a TXOP duration field has a size of 7 bits and 48 us can be used as a single granularity unit. In this case, a maximum value capable of being indicated by the TXOP duration field may correspond to 6144 us.

TABLE 6

| B0~B6 | TXOP duration range | Unit | TXOP duration value |
|---|---|---|---|
| 0000000~1111111 | 0 us~6144 us | 48 us | 48 * (the value of B0~B6) us |

The abovementioned options are just an example only. The present invention may be non-limited by the options. For example, a TXOP duration field is configured by 7 bits and two granularities (8 us and 128 us) can be used. B0=0 can indicate 8 us and B0=128 us. If B0 corresponds to 0, a TXOP duration value may correspond to '8 us*value of (B1~B6)' us. If B0 corresponds to 1, a TXOP duration value may correspond to '512+128 us*value of (B1~B6)' us.

Proposal 2

In proposal 1, a structure of TXOP duration field and definition on a bit value indicated by the TXOP duration field have been explained. For example, if it is assumed that TXOP duration corresponds to 7 bits and an STA/AP indicates 'Y' us using a TXOP duration value, a method of configuring B0~B6 of the TXOP duration field to indicate the 'Y' us has been explained through the proposal 1. Similarly, a method for an STA/AP receiving a frame to interpret B0~B6 of the TXOP duration field to induce a correct TXOP duration value='Y' us has been explained through the proposal 1.

Meanwhile, it is necessary to define a TXOP duration value to be indicated via a TXOP duration field before an STA/AP transmitting a frame configures B0~B6 of the TXOP duration field. For example, it is necessary to define a method for determining a 'Y' value itself.

In proposal 2, methods for determining 'Y' us corresponding to a value to be indicated via a TXOP duration field of HE-SIG A field are explained.

(1) Option 1

In a TXOP, a TXOP duration field in the remaining PPDUs except a first PPDU can be configured in accordance with a TXOP granularity based on a TXOP duration value (e.g., a TXOP duration field of HE-SIG A or MAC duration) included in a PPDU which is received immediately before the PPDU (i.e., before SIFS).

For example, assume that a PPDU '1', a PPDU '2', . . . , a PPDU 'N' are sequentially transmitted and received in a TXOP. When an STA intends to transmit a PPDU 'i' (where, 1<i<N+1), the STA can determine a value to be set to a TXOP duration field of a HE-SIG A field of the PPDU 'i' based on TXOP duration indicated by a PPDU 'i−1'.

For example, if a value of TXOP duration indicated by the PPDU 'i−1' corresponds to 'X', the STA can configure 'Y' corresponding to a value of the TXOP duration field included in the HE-SIG A of the HE PPDU using (X—duration of PPDU 'l'—SIFS) or (X—duration of PPDU 'i').

In this case, an accurate TXOP duration value should be calculated based on a granularity of TXOP duration. For example, if a calculated value 'Y' is not a multiple of the granularity, the STA can set an approximate value of the 'Y' to the TXOP duration field via one of multiples of the granularity. Specifically, the STA can set a smallest value among the multiples of the granularity greater than the Y to the TXOP duration field. Or, the STA can set a biggest value among the multiples of the granularity smaller than the Y to the TXOP duration field. Meanwhile, if the 'Y' corresponds to a multiple of the granularity, the Y is configured as TXOP duration.

Tables 7 and 8 in the following illustrate a case of granularity=32 us and a case of granularity=16 us, respectively.

TABLE 7

| Y | TXOP duration (Granularity = 32 us) |
|---|---|
| 1 < Y ≤ 32 | 32 |
| 32 < Y ≤ 64 | 64 |
| 64 < Y ≤ 96 | 96 |
| 96 < Y ≤ 128 | 128 |
| . . . | . . . |

TABLE 8

| Y | TXOP duration (Granularity = 16 us) |
|---|---|
| 1 < Y ≤ 16 | 16 |
| 16 < Y ≤ 32 | 32 |
| 32 < Y ≤ 48 | 48 |
| 48 < Y ≤ 64 | 64 |
| . . . | . . . |

If a first PPDU corresponds to a HE PPDU in a TXOP, TXOP duration of the HE PPDU can be configured based on MAC duration of the HE PPDU. For example, if a value of the MAC duration corresponds to a multiple of granularity of a TXOP duration field, an STA sets the value of the MAC duration to the TXOP duration field. On the other hand, if the value of the MAC duration is not a multiple of the granularity of the TXOP duration field, the STA can set an approximate value of the MAC duration to the TXOP duration field. For example, the STA can configure the TXOP duration using a smallest value among multiples of TXOP granularity greater than the MAC duration value. Detail examples for the configuration are shown in Tables 7 and 8. Or, the STA can configure the TXOP duration using a biggest value among the multiples of the TXOP granularity smaller than the MAC duration value.

As a different example, the STA can configure a value to be set to duration of a MAC header in a unit of granularity of TXOP duration. For example, the STA can transmit a calculated TXOP duration value to a MAC duration field by duplicating the TXOP duration value.

(2) Option 2

According to the option 1, when an STA intends to transmit a PPDU i (where, i is not 1), the STA determines a TXOP duration field of the PPDU i based on a PPDU i−1.

On the other hand, according to the option 2, the STA can configure the TXOP duration field of the PPDU i based on a MAC duration field of the PPDU i. This is practically identical to the method of configuring the TXOP duration field of the PPDU 1 mentioned earlier in the option 1.

For example, the STA configures a value of TXOP duration included in HE-SIG A based on calculated MAC duration. If a value of the calculated MAC duration corresponds to a multiple of granularity of TXOP duration, the TXOP duration is configured by the MAC duration value. Otherwise, the TXOP duration is configured by a smallest value among multiples of the TXOP granularity greater than the MAC duration value. Detail examples for the configuration are shown in Tables 7 and 8.

Meanwhile, MAC duration can be calculated using a method identical to a method of a legacy system.

Proposal 3

As mentioned in the foregoing description, TXOP duration information is transmitted in a manner of being included in a HE-SIG A field of HE PPDU and an STA can update NAV based on the TXOP duration information. And, a value of a TXOP duration field included in the HE-SIG A can be configured based on a remaining TXOP value. For example, the STA calculates a remaining TXOP in a current frame using a TXOP value indicated by a MAC duration field of a frame which is received immediately before the current frame and can configure a duration value in a MAC header of the current frame and a TXOP duration value of the HE-SIG A.

However, similar to a case of using a compressed MAC header of which duration is omitted from a HE MU PPDU, if duration field information does not exist in a MAC header, it is difficult for an STA to configure a TXOP value to be included in the HE-SIG A, when the STA transmits a UL MU frame. A method of configuring TXOP duration of a UL MU frame and a method of configuring NAV via a relevant frame are explained in the proposal 3.

For example, an AP can transmit a trigger frame to an STA to set a value to a TXOP duration field of HE-SIG A of a PPDU (e.g., HE trigger based PPDU) to be transmitted by the STA. If the STA receives the trigger frame and an AID of the STA is included in the trigger frame, the STA can configure the TXOP duration field of the HE-SIG A of the PPDU (e.g., HE trigger based PPDU) using the TXOP duration field value included in the trigger frame.

FIG. 21 illustrates a common info field of a trigger frame according to one embodiment of the present invention. Referring to FIG. 21, an AP can transmit a trigger frame by including a value to be set to a TXOP duration field by an STA transmitting a HE trigger based PPDU in the common info field of the trigger frame.

Meanwhile, the TXOP duration field included in the common info field can be configured by a format identical to a format of a TXOP duration field to be included in HE-SIG A of HE trigger based PPDU. For example, if the TXOP duration field to be included in the HE-SIG A is configured by a size of 7 bits, a granularity of 32 us, and a max value of 4 ms, the TXOP duration field included in the common info field of the trigger frame can also be configured by a size of 7 bits, a granularity of 32 us, and a max value of 4 ms. The format of the TXOP duration field is not restricted to the abovementioned example. It may be able to use a format according to the aforementioned proposal 1.

The TXOP duration field can be transmitted via a broadcast trigger frame, by which the present invention may be non-limited. The TXOP duration field can be transmitted via a unicast trigger frame. Or, the TXOP duration field can be transmitted in a manner of being included in information of a trigger frame which is transmitted via a HE variant HT control field.

As a different method, an AP can indicate a value of a TXOP duration field to be set to a PPDU transmitted by an STA in a compressed form. For example, information on a trigger frame can be included in a HE variant HT control field (e.g., HE A-control field). In this case, a size of the HE A-control field corresponds to 4 bytes and an actual size of the information corresponds to 24 bits. In particular, there is a restriction on the size of the HE A-control field. Hence, if TXOP duration transmitted via the HE A-control filed has a size identical to a size of a TXOP duration field (e.g., 7-bit) included in HE-SIG A, the TXOP duration may become overhead. Hence, the AP can indicate information on the TXOP duration in a compressed from shown in Tables 9 to 11. Table 9 illustrates a case that the TXOP duration information is indicated using 1 bit, Table 10 illustrates a case that the TXOP duration information is indicated using 2 bits, and Table 11 illustrates a case that the TXOP duration information is indicated using 3 bit, respectively.

TABLE 9

| 1-bit | TXOP value |
|---|---|
| 0 | 0 |
| 1 | Maximum value |

0 indicates that TXOP duration is configured by a value of 0. 1 indicates that TXOP duration is configured by a maximum value.

TABLE 10

| 2-bits | TXOP value |
|---|---|
| 00 | 0 |
| 01 | EIFS length |
| 10 | reserved |
| 11 | Maximum value (e.g., 4 ms) |

00 indicates that TXOP duration is configured by a value of 0. 01 indicates that TXOP duration is configured by EIEF length. 11 indicates that TXOP duration is configured by a maximum value (all bits are configured by 1).

TABLE 11

| 3-bits | TXOP value |
|---|---|
| 000 | 0 us |
| 001 | 512 us |
| 010 | 1024 us |
| 011 | 1536 us |
| 100 | 2048 us |
| 101 | 2560 us |
| 110 | 3072 us |
| 111 | Maximum value (e.g., 4096 us) |

As shown in Table 11, if an AP indicates a TXOP value in a form of 3 bits, an STA configures a TXOP duration field of a HE trigger based PPDU using a value determined by the 3 bits.

Proposal 4

If duration is included in a MAC header, the duration included in the MAC header indicates a length of the entire TXOP and an STA can configure a value of a TXOP duration field of HE-SIG A using a value of the duration included in the MAC header.

Yet, if the TXOP duration field of the HE SIG-A is able to cover up to 4 ms (e.g., 7 bits size, 32 us unit), the TXOP duration field of the HE-SIG A can protect until a next PPDU only.

According to one embodiment, in a previous frame, a duration field of a MAC header can be configured as a section capable of protecting a next frame in the same direction (e.g., UL/DL) instead of the remaining TXOP value. For example, duration of a DL MAC frame is configured by duration until the timing at which transmission of a next DL MAC frame is completed and duration of a UL MAC frame can be configured by duration until the timing at which transmission of a next UL MAC frame is completed.

Figure 22:
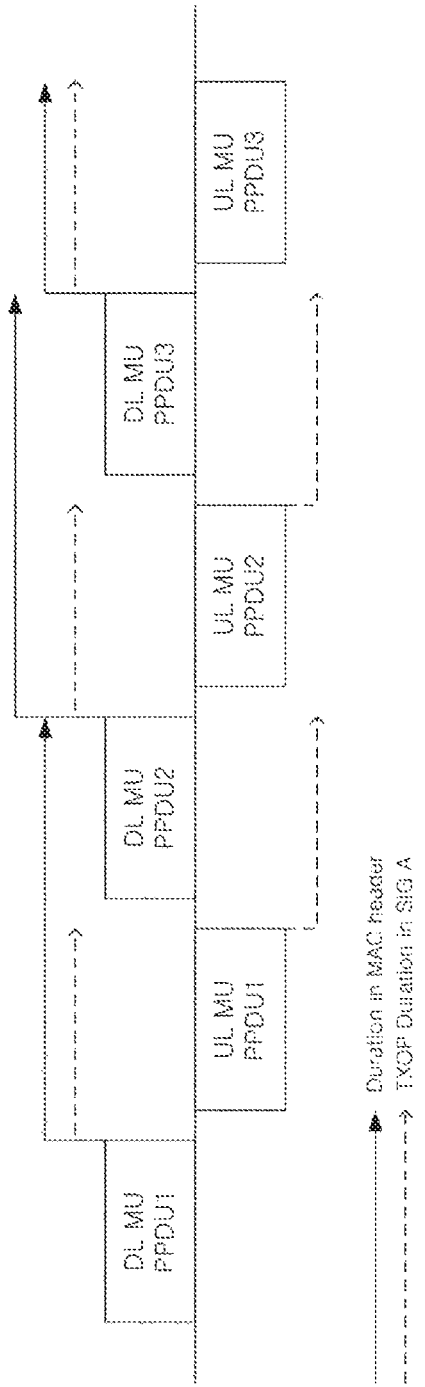
FIG. 22 illustrates a MAC duration configuration according to one embodiment of the present invention.

FIG. 22 illustrates a MAC duration configuration according to one embodiment of the present invention.

Figure 23:
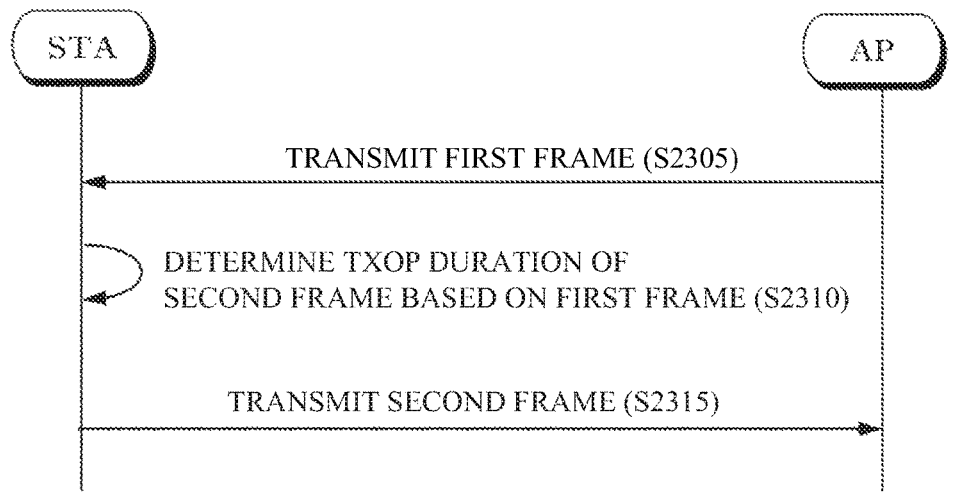
FIG. 23 is a flowchart for a method of transmitting and receiving a frame according to one embodiment of the present invention.

Referring to FIG. 23, a length from MAC duration of a DL MU PPDU 1 to a DL MU PPDU 2 is indicated. An STA configures TXOP duration of HE-SIG A of a UL MU PPDU 1 using the MAC duration of the DL MU PPDU 1. In this case, the TXOP duration of the HE-SIG A of the UL MU PPDU 1 is configured to protect the DL MU PPDU 2 as well.

An AP configures TXOP duration of HE-SIG A of the DL MU PPDU 1 to protect the UL MU PPDU 1 corresponding to a next frame as well. The AP configures the TXOP duration of the HE-SIG A of the DL MU PPDU 2 to protect a UL MU PPDU 2 as well and configures TXOP duration of a DL MU PPDU 3 to protect a UL MU PPDU 3 as well.

The AP configures the MAC duration of the DL MU PPDU 2 by a length capable of protecting the UL MU PPDU 2 and the DL MU PPDU 3 and configures the MAC duration of the DL MU PPDU 3 to protect the UL MU PPDU 3.

Meanwhile, it may use a method of indicating an EIFS value instead of a method of indicating the entire TXOP value via a TXOP duration field. In particular, a third party STA configures a TXOP value indicated via the TXOP duration field as an EIFS value to perform an EIFS operation rather than updates NAV via the TXOP duration field included in the HE PPDU. If the TXOP value indicated via the TXOP duration field is smaller than a legacy EIFS value, the third party STA operates using the legacy EIFS value. In particular, a PPDU, which is transmitted after a HE PPDU, can be protected via a TXOP value indicated by the HE PPDU.

Proposal 5

As mentioned in the foregoing description, a value of the TXOP duration field of the HE-SIG A can be calculated and configured via a value of a duration field of a current MAC frame or a value of a duration field of a MAC frame which is received immediately before the current MAC frame.

For example, an STA can calculate a duration value for a frame to be currently transmitted using a value of a duration field included in a MAC header of a received PPDU (e.g., MAC duration of previous frame—SIFS—duration of a current PPDU). The STA can configure a value of TXOP duration of HE-SIG A using the calculated value of the duration field included in the MAC header.

In particular, in case of using a round-down scheme that calculates a TXOP duration value using MAC duration, the TXOP duration value can be configured by a value equal to or less than a duration value of a MAC header. When the TXOP duration value is configured by the value equal to or less than the duration value of the MAC header, a biggest value among valid small values (e.g., multiples of a granularity) can be configured as the TXOP duration value. For example, if the calculated duration value of the MAC header corresponds to 190 us and a granularity of the TXOP duration corresponds to 8 us, the value of the TXOP duration is configured by 184 us (=8*23).

Meanwhile, if all bits of the TXOP duration field are set to 1 (i.e., TXOP duration field is configured by 127=1111111 (2)), it indicates that TXOP duration is not valid. If a HE PPDU including a TXOP duration field of which all bits are set to 1 is received, unintended STAs do not perform NAV update using a value of the TXOP duration.

If an STA is able to set all bits of a TXOP duration field to 1 and indicate that a value indicated by TXOP duration of a PPDU is not valid, it may cause a failure of UL MU transmission. For example, when STAs trigger transmission of a UL frame via a trigger frame, a part of the STAs may set all bits of a TXOP duration field to 1 and other STAs may calculate and configure a value of the TXOP field based on MAC duration of the received trigger frame/MAC duration of a current frame. In this case, a third party STA/AP may fail to properly obtain a TXOP duration value included in a HE trigger based PPDU respectively transmitted from a plurality of STAs.

In order to solve the problem, when HE STAs transmit a HE trigger based PPDU, a method of configuring a value of a TXOP duration field of HE-SIG A is proposed.

(1) Option 1: When STAs transmit HE trigger based PPDU, it is able to configure the STAs to set a duration value of a MAC header included in the HE trigger based PPDU based on a duration field included in a trigger frame and calculate a value of a TXOP duration field based on the duration value of the MAC header. Since a value of the duration field included in the trigger frame and a length of the HE trigger based PPDU are identically applied to all STAs, a TXOP duration field of a HE trigger based PPDU transmitted by each STA can be identically configured.

(2) Option 2: When STAs transmit HE trigger based PPDU, the STAs can transmit the HE trigger based PPDU by setting all bits of a TXOP duration field to 1. Since the TXOP duration field of the HE trigger based PPDU transmitted by all STAs is identically configured, an AP can properly receive the HE trigger based PPDU. However, if all bits of the TXOP duration field are set to 1, it may have a demerit in that it is unable to protect a frame which is transmitted after the HE trigger based PPDU. Hence, in dense wireless LAN environment, a probability of failure in receiving a response (e.g., Multi-STA block ACK) in response to the HE trigger based PPDU may increase.

(3) Option 3: When an AP transmits a trigger frame, information on whether all bits of a TXOP duration field are set to 1 (option 2) or information on whether all bits of the TXOP duration field are configured by a value calculated according to the option 1 (e.g., TXOP duration setting indicator) can be transmitted in a manner of being included in the trigger frame. In order to indicate the information, the trigger frame requires 1 bit. A new field of 1 bit can be added to the trigger frame, one of reserved bits is used, or an unused field among legacy fields can be used to indicate the information.

For example, in case of using a 1-bit field, 0 indicates that a TXOP duration field calculated based on MAC duration (option 1) is included in a HE trigger based PPDU. 1 indicates that a TXOP duration field of which all bits are set to 1 is included in the HE trigger based PPDU.

In a not dense wireless LAN environment, an AP sets a 1-bit field to 1 in a trigger frame to make all bits of a TXOP duration field of HE trigger based PPDU to be set to 1.

Meanwhile, application of the present proposal is not restricted to a trigger frame. For example, an AP can transmit information for making intended STAs configure a value of a TXOP duration field of HE trigger based PPDU by including the information in a HE A-control field indicating whether or not UL MU response scheduling information is included.

For example, if the AP sets a TXOP duration setting indicator included in a trigger frame or a HE-A control field for scheduling a UL MU response to 0, an STA calculates and configures a value of a TXOP duration field of a PPDU based on MAC duration when the STA transmits the HE trigger based PPDU (e.g., round-down scheme). On the contrary, if the TXOP duration setting indicator is set to 1, the STA can configure the TXOP duration field of the PPDU by a value indicating that a TXOP duration value is not valid when the STA transmits the HE trigger based PPDU (i.e., all bits are set to 1).

FIG. 23 is a flowchart for a method of transmitting and receiving a frame according to one embodiment of the present invention. Explanation on contents overlapped with the aforementioned contents can be omitted.

Referring to FIG. 23, an STA receives a first frame from an AP (access point) [S2305]. The first frame may correspond to a trigger frame allocating a resource for multi-user uplink transmission.

The STA determines a TXOP duration (transmission opportunity duration) value included in a SIG (signaling) field of a second frame to be transmitted by the STA based on the first frame [S2310]. The second frame may correspond to a multi-user uplink frame transmitted via a resource allocated by a trigger frame.

The SIG field (e.g., HE-SIG A field) can include a TXOP duration field of a size of 7 bits that indicates a TXOP duration value. The TXOP duration field can support multiple granularities (e.g., 8 us, 128 us) in time units. In the TXOP duration field of the size of 7 bits, an MSB (most significant bit) can indicate a granularity used for the TXOP duration value among the granularities of the multiple time units.

In determining a TXOP duration value to be included in the second frame, the STA can calculate a residual TXOP duration to be remained after the second frame is transmitted based on TXOP duration (e.g., TXOP duration of HE-SIG A or MAC duration of an MAC header) indicated by the first frame. If the residual TXOP duration is not a multiple of a granularity of a time unit used in the SIG field, the STA can approximate the residual TXOP duration to a first TXOP duration value which is a multiple of a granularity.

The residual TXOP duration can be calculated by subtracting a length of the second frame and an inter-frame space from the TXOP duration indicated by the first frame.

The STA can configure the residual TXOP duration with a MAC duration included in an MAC header of the second frame. In this case, the first TXOP duration value may correspond to a value closest to the MAC duration among values which are multiples of a granularity and are equal to or less than the MAC duration.

In determining the TXOP duration value, the STA can select one from among a first TXOP duration value and a second TXOP duration value (e.g., 127) indicating that the TXOP duration value is not valid as the TXOP duration value. The first frame can include an indicator (e.g., TXOP duration setting indicator) indicating whether the STA should select the first TXOP duration value or the second TXOP duration value. The indicator can be received via a common info field or an HT (high throughput) control field of the trigger frame.

The STA transmits the second frame [S2315].

Figure 24:
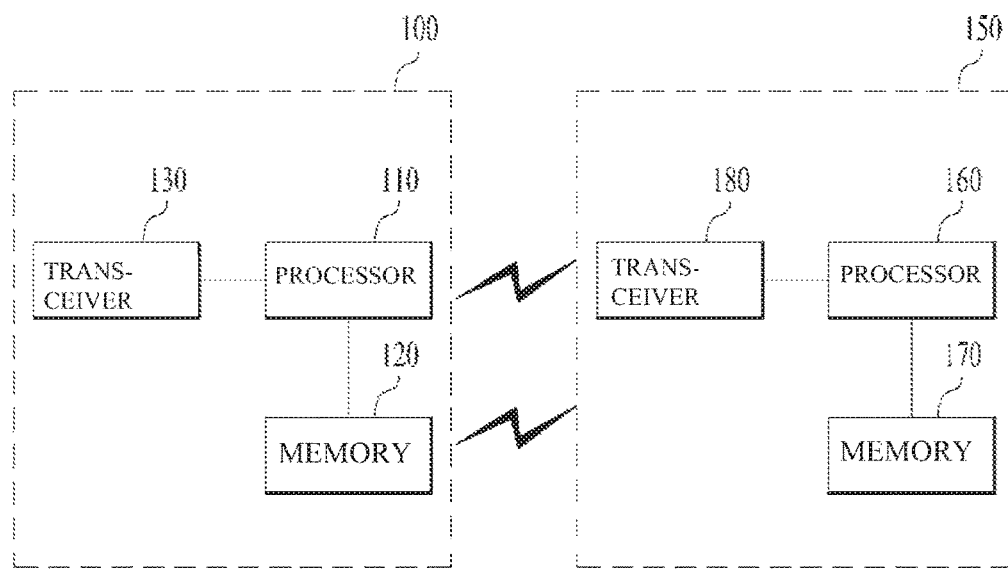
FIG. 24 is a diagram for explaining a device according to one embodiment of the present invention.

FIG. 24 is an explanatory diagram of apparatuses for implementing the aforementioned method.

A wireless device 100 and a wireless device 150 in FIG. 24 may correspond to the aforementioned STA/AP 1 and STA/AP 2, respectively.

The STA 100 may include a processor 110, a memory 120, and a transceiver 130 and the AP 150 may include a processor 160, a memory 170, and a transceiver 180. The transceivers 130 and 180 may transmit/receive a wireless signal and may be implemented in a physical layer of IEEE 802.11/3GPP. The processors 110 and 160 are implemented in a physical layer and/or a MAC layer and are connected to the transceivers 130 and 180. The processors 110 and 160 may perform the above-described UL MU scheduling procedure.

The processors 110 and 160 and/or the transceivers 130 and 180 may include an Application-Specific Integrated Circuit (ASIC), a chipset, a logical circuit, and/or a data processor. The memories 120 and 170 may include a Read-Only Memory (ROM), a Random Access Memory (RAM), a flash memory, a memory card, a storage medium, and/or a storage unit. If an example is performed by software, the above-described method may be executed in the form of a module (e.g., a process or a function) performing the above-described function. The module may be stored in the memories 120 and 170 and executed by the processors 110 and 160. The memories 120 and 170 may be located at the interior or exterior of the processors 110 and 160 and may be connected to the processors 110 and 160 via known means.

The detailed description of the preferred examples of the present invention has been given to enable those skilled in the art to implement and practice the invention. Although the invention has been described with reference to the preferred examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

The present invention can be applied to various wireless communication systems including IEEE 802.11.

What is claimed is:

1. A method of transmitting a frame by a station (STA) in a wireless local area network (LAN) system, the method comprising:
   receiving a first frame from an access point (AP);
   determining, based on the first frame, a transmission opportunity (TXOP) duration value contained in a signaling (SIG) field of a second frame to be transmitted by the STA; and
   transmitting the second frame,
   wherein in determining the TXOP duration value, the STA calculates, based on a TXOP duration indicated by the first frame, a residual TXOP duration to be remained after the second frame is transmitted and
   wherein when the residual TXOP duration is not a multiple of a granularity of a time unit used in the SIG field, the STA approximates the residual TXOP duration to a first TXOP duration value which is the multiple of the granularity.

2. The method of claim 1, wherein the residual TXOP duration is calculated by subtracting a length of the second frame and an inter-frame space from the TXOP duration indicated by the first frame.

3. The method of claim 1,
   wherein in determining the TXOP duration value, the STA selects the TXOP duration value from among the first TXOP duration value and a second TXOP duration value indicating that the TXOP duration value is not valid and
   wherein the first frame contains an indicator indicating whether the STA should select the first TXOP duration value or the second TXOP duration value.

4. The method of claim 3,
   wherein the first frame corresponds to a trigger frame allocating a resource for multi-user uplink transmission and
   wherein the second frame corresponds to a multi-user uplink frame transmitted via the resource allocated by the trigger frame.

5. The method of claim 4, wherein the indicator is received via a common information field or a high throughput (HT) control field of the trigger frame.

6. The method of claim 1,
   wherein the STA sets a MAC duration contained in a MAC header of the second frame to the residual TXOP duration and
   wherein the first TXOP duration value is a value closest to the MAC duration among values which are multiples of the granularity and are equal to or less than the MAC duration.

7. The method of claim 1,
   wherein the SIG field contains 7-bit of a TXOP duration field indicating the TXOP duration value,
   wherein the TXOP duration field supports multiple granularities of time units, and
   wherein a most significant bit (MSB) of the 7-bit of the TXOP duration field indicates a granularity used for the TXOP duration value among the multiple granularities of the time units.

8. A station (STA) in a wireless local area network (LAN) system, the STA comprising:
   a receiver to receive a first frame from an access point (AP);
   a processor to determine, based on the first frame, a transmission opportunity (TXOP) duration value contained in a signaling (SIG) field of a second frame to be transmitted by the STA;

a memory to store a process executed by the processor; and a transmitter to transmit the second frame, wherein in determining the TXOP duration value, the processor calculates, based on a TXOP duration indicated by the first frame, a residual TXOP duration to be remained after the second frame is transmitted and wherein when the residual TXOP duration is not a multiple of a granularity of a time unit used in the SIG field, the processor approximates the residual TXOP duration to a first TXOP duration value which is the multiple of the granularity.

9. The STA of claim 8, wherein the residual TXOP duration is calculated by subtracting a length of the second frame and an inter-frame space from the TXOP duration indicated by the first frame.

10. The STA of claim 8, wherein in determining the TXOP duration value the processor selects the TXOP duration value from among the first TXOP duration value and a second TXOP duration value indicating that the TXOP duration value is not valid and wherein the first frame contains an indicator indicating whether the processor should select the first TXOP duration value or the second TXOP duration value.

11. The STA of claim 10, wherein the first frame corresponds to a trigger frame allocating a resource for multi-user uplink transmission and wherein the second frame corresponds to a multi-user uplink frame transmitted via the resource allocated by the trigger frame.

12. The STA of claim 11, wherein the indicator is received via a common information field or a high throughput (HT) control field of the trigger frame.

13. The STA of claim 8, wherein the processor sets a MAC duration contained in a MAC header of the second frame to the residual TXOP duration and wherein the first TXOP duration value is a value closest to the MAC duration among values which are multiples of the granularity and are equal to or less than the MAC duration.

14. The STA of claim 8, wherein the SIG field contains 7-bit of a TXOP duration field indicating the TXOP duration value, wherein the TXOP duration field supports multiple granularities of time units, and wherein a most significant bit (MSB) of 7-bit of the TXOP duration field indicates a granularity used for the TXOP duration value among the multiple granularities of the time units.

* * * * *